US008830215B2

(12) United States Patent
Ono et al.

(10) Patent No.: US 8,830,215 B2
(45) Date of Patent: *Sep. 9, 2014

(54) DISPLAY DEVICE INCLUDING PLURAL DISPLAYS

(75) Inventors: Shinya Ono, Osaka (JP); Kouhei Ebisuno, Kyoto (JP)

(73) Assignee: Panasonic Corporation, Osaka (JP)

( * ) Notice: Subject to any disclaimer, the term of this patent is extended or adjusted under 35 U.S.C. 154(b) by 87 days.

This patent is subject to a terminal disclaimer.

(21) Appl. No.: 13/493,087

(22) Filed: Jun. 11, 2012

(65) Prior Publication Data

US 2013/0038596 A1 Feb. 14, 2013

Related U.S. Application Data

(63) Continuation of application No. PCT/JP2011/004511, filed on Aug. 9, 2011.

(51) Int. Cl.
G09G 3/36 (2006.01)
G09G 3/32 (2006.01)
G06F 3/038 (2013.01)

(52) U.S. Cl.
CPC .............. *G06F 3/038* (2013.01); *G09G 3/3233* (2013.01); *G09G 2310/0245* (2013.01); *G09G 2300/0819* (2013.01); *G09G 2310/0262* (2013.01); *G09G 2310/0221* (2013.01)
USPC ............................. 345/204; 345/211; 345/212

(58) Field of Classification Search
USPC ............ 345/8, 1.2, 76, 633; 349/15; 375/222; 463/20
See application file for complete search history.

(56) References Cited

U.S. PATENT DOCUMENTS

| 6,590,553 | B1 | 7/2003 | Kimura et al. |
| 7,015,882 | B2 | 3/2006 | Yumoto |
| 7,362,304 | B2 | 4/2008 | Takatori et al. |
| 7,564,443 | B2 | 7/2009 | Takatori et al. |
| 8,018,404 | B2 | 9/2011 | Ono |
| 8,120,551 | B2 | 2/2012 | Yumoto |

(Continued)

FOREIGN PATENT DOCUMENTS

| JP | 10-312173 | 11/1998 |
| JP | 2002-062518 | 2/2002 |

(Continued)

OTHER PUBLICATIONS

International Search Report in PCT/JP2011/004511, dated Nov. 15, 2011.

*Primary Examiner* — Dwayne Bost
*Assistant Examiner* — Sepehr Azari
(74) *Attorney, Agent, or Firm* — Greenblum & Bernstein, P.L.C.

(57) ABSTRACT

A display device according to the present invention includes: an organic EL element; an electrostatic holding capacitor; a drive transistor having a gate connected to one electrode of an electrostatic holding capacitor and a source connected to an anode of the organic EL element; another electrostatic holding capacitor having an electrode connected to the other electrode of the one electrostatic holding capacitor; a negative power supply line which determines a potential of a cathode of the organic EL element; and a scanning line drive circuit which controls switching transistors. In a display period, the entire display area of a display unit is caused to start generating photons at once. In a non-display period, the entire display area of the display unit is caused to stop generating photons at once, and the drive transistor is reset.

5 Claims, 24 Drawing Sheets

(56) References Cited

U.S. PATENT DOCUMENTS

| | | | |
|---|---|---|---|
| 2003/0128200 A1 | 7/2003 | Yumoto | |
| 2004/0056831 A1 | 3/2004 | Takatori et al. | |
| 2005/0255912 A1* | 11/2005 | Love et al. | 463/30 |
| 2006/0119552 A1 | 6/2006 | Yumoto | |
| 2006/0279489 A1 | 12/2006 | Ouchi et al. | |
| 2008/0158140 A1 | 7/2008 | Takatori et al. | |
| 2010/0259531 A1 | 10/2010 | Ono | |
| 2011/0025586 A1* | 2/2011 | Lee | 345/76 |
| 2011/0164024 A1 | 7/2011 | Ono | |
| 2011/0285760 A1 | 11/2011 | Ono | |
| 2012/0062618 A1 | 3/2012 | Ono | |

FOREIGN PATENT DOCUMENTS

| | | |
|---|---|---|
| JP | 2004-117758 | 4/2004 |
| JP | 2006-343556 | 12/2006 |
| JP | 4719821 | 7/2011 |
| WO | 02/39420 | 5/2002 |
| WO | 2010/041426 | 4/2010 |

* cited by examiner

DISPLAY DEVICE INCLUDING PLURAL DISPLAYS

CROSS REFERENCE TO RELATED APPLICATION

This is a continuation application of PCT application No. PCT/JP2011/004511 filed on Aug. 9, 2011, designating the United States of America.

BACKGROUND OF THE INVENTION (1) Field of the Invention

The present invention relates to display devices, and particularly to a display device using current-driven luminescence elements.

(2) Description of the Related Art

Display devices using organic electroluminescence (EL) elements are well-known as display devices using current-driven luminescence elements. An organic EL display device using such self-luminous organic EL elements does not require backlights necessary in a liquid crystal display device and is most suitable for increasing device thinness. Furthermore, since viewing angle of such an organic EL display is not limited, practical application as a next-generation display device is expected. Furthermore, the organic EL elements used in the organic EL display device are different from liquid crystal cells, which are controlled according to voltage applied thereto, in that the luminance of the respective luminescence elements is controlled according to the amount of current flowing thereto.

In the organic EL display device, the organic EL elements included in the pixels are normally arranged in rows and columns. An organic EL display is called a passive-matrix organic EL display, in which organic EL elements are provided at crosspoints of row electrodes (scanning lines) and column electrodes (data lines) and voltages corresponding to data signals are applied between selected row electrodes and the column electrodes to drive the organic EL elements.

On the other hand, in an organic EL display device referred to as an active-matrix organic EL display device, a switching thin film transistor (TFT) is provided in each crosspoint between scanning lines and data lines, the gate of a drive element is connected to the switching TFT, the switching TFT is turned ON through a selected scanning line so as to input a data signal from a signal line to the drive element, and the organic EL elements are driven by the drive element.

Unlike in the passive-matrix organic EL display device in which, only during the period when each of the row electrodes (scanning lines) is selected, does the organic EL element connected to the selected row electrode generate photons, in the active-matrix organic EL display device, it is possible to cause the organic EL element to generate photons until a subsequent scan (selection), and thus increase in the number of scanning lines does not cause reduction in display luminance. Therefore, the active-matrix organic EL display device can be driven at a low voltage and thus allows for reduced power consumption.

For example, International Publication No. 2010/041426 (Patent Reference 1) discloses a circuit configuration of a pixel unit in an active-matrix organic EL display device and a method of driving the display device.

SUMMARY OF THE INVENTION

However, as described below, there is a problem with the pixel circuit disclosed in Patent Reference 1 when it is used for line-sequential driving in which a display area is vertically split and a resetting period is provided to reduce occurrence of an afterimage due to change in electric characteristics of a drive transistor.

Specifically, the problem is that a split line inevitably recognizable appears in a display area because of difference in timing when the display area, which is included in a large-size panel, is vertically split and line-sequentially driven with a resetting period using the pixel circuit disclosed in Patent Reference 1. For example, an image in the display area is vertically broken up by the split line as shown in FIG. 11. The split line becomes conspicuous when a white vertical bar displayed on the panel is moved sideways.

The present invention is conceived in view of the above-described problem and has an object of providing a display device in which simple pixel circuitry makes a split line visually unrecognizable and prevents occurrence of an afterimage due to change in electric characteristics of a drive transistor when a display area is vertically split into parts for driving.

In order to achieve the object, the display device according to an aspect of the present invention includes: a display unit composed of a first display unit and a second display unit; and a driver unit which is configured to drive the first display unit and the second display unit, wherein each of the first display unit and the second display unit includes: a plurality of pixels arranged in rows and columns; a scanning line provided for each of the rows; a control line provided for each of the rows; a data line provided for each of the columns; and a first power supply line and a second power supply line for supplying power to the pixels, each of the pixels includes: a luminescence element having electrodes one of which is connected to the second power supply line; a drive transistor having a source electrode connected to the luminescence element and a drain electrode connected to the first power supply line; a first capacitor having electrodes one of which is connected to a gate electrode of the drive transistor; a first switching transistor which has a gate electrode connected to the scanning line and switches conduction and non-conduction between the gate electrode of the drive transistor and a first reference potential line which provides a predetermined reference potential; a second switching transistor which has a gate electrode connected to the scanning line and switches conduction and non-conduction between the data line and the other of the electrodes of the first capacitor; a third switching transistor which has a gate electrode connected to the control line and switches conduction and non-conduction between the other of the electrodes of the first capacitor and the source electrode of the drive transistor; and a second capacitor having electrodes one of which is connected to the other of the electrodes of the first capacitor and the other of which is connected to a second reference potential line which provides a predetermined reference potential, and the driver unit is configured to: cause conduction of the first switching transistor through the scanning line in each of all the pixels of the first display unit and the second display unit to apply the predetermined reference potential to the gate electrode of the drive transistor in the pixel, and thereby stop photon generation of all of the pixels at a same time so that a non-display period is started; and cause conduction of the third switching transistor through the control line in each of all the pixels of the first display unit and the second display unit to apply a signal voltage held by the first capacitor between the gate electrode and the source electrode of the drive transistor in the pixel, and thereby start photon generation of all of the pixels at a same time so that a display period is started.

According to the present invention, a display device can be provided in which simple pixel circuitry makes a split line visually unrecognizable and prevents occurrence of an afterimage due to change in electric characteristics of a drive transistor when a display area is vertically split into parts for driving.

FURTHER INFORMATION ABOUT TECHNICAL BACKGROUND TO THIS APPLICATION

The disclosure of PCT application No. PCT/JP2011/004511 filed on Aug. 9, 2011, including specification, drawings and claims is incorporated herein by reference in its entirety.

BRIEF DESCRIPTION OF THE DRAWINGS

These and other objects, advantages, and features of the invention will become apparent from the following description thereof taken in conjunction with the accompanying drawings that illustrate a specific embodiment of the invention. In the Drawings.

DESCRIPTION OF THE PREFERRED EMBODIMENTS

Figure 1:
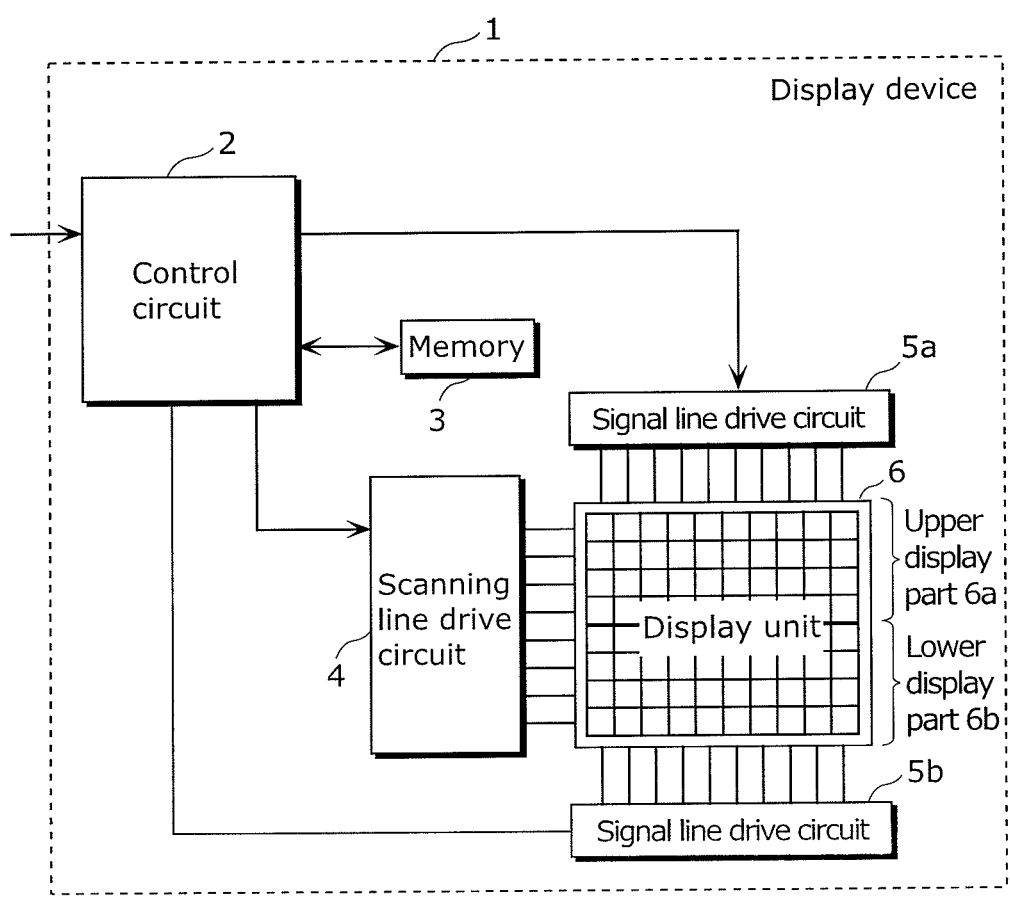
FIG. 1 is a block diagram showing an electrical configuration of a display device according to an embodiment of the present invention.

The display device according to an aspect of the present invention includes: display device according to an aspect of the present invention includes: a display unit composed of a first display unit and a second display unit; and a driver unit which is configured to drive the first display unit and the second display unit, wherein each of the first display unit and the second display unit includes: a plurality of pixels arranged in rows and columns; a scanning line provided for each of the rows; a control line provided for each of the rows; a data line provided for each of the columns; and a first power supply line and a second power supply line for supplying power to the pixels, each of the pixels includes: a luminescence element having electrodes one of which is connected to the second power supply line; a drive transistor having a source electrode connected to the luminescence element and a drain electrode connected to the first power supply line; a first capacitor having electrodes one of which is connected to a gate electrode of the drive transistor; a first switching transistor which has a gate electrode connected to the scanning line and switches conduction and non-conduction between the gate electrode of the drive transistor and a first reference potential line which provides a predetermined reference potential; a second switching transistor which has a gate electrode connected to the scanning line and switches conduction and non-conduction between the data line and the other of the electrodes of the first capacitor; a third switching transistor which has a gate electrode connected to the control line and switches conduction and non-conduction between the other of the electrodes of the first capacitor and the source electrode of the drive transistor; and a second capacitor having electrodes one of which is connected to the other of the electrodes of the first capacitor and the other of which is connected to a second reference potential line which provides a predetermined reference potential, and the driver unit is configured to: cause conduction of the first switching transistor through the scanning line in each of all the pixels of the first display unit and the second display unit to apply the predetermined reference potential to the gate electrode of the drive transistor in the pixel, and thereby stop photon generation of all of the pixels at a same time so that a non-display period is started; and cause conduction of the third switching transistor through the control line in each of all the pixels of the first display unit and the second display unit to apply a signal voltage held by the first capacitor between the gate electrode and the source electrode of the drive transistor in the pixel, and thereby start photon generation of all of the pixels at a same time so that a display period is started.

According to the present aspect, the problem with the display device having a display area vertically split into parts for driving is solved by causing the entire display unit to start generating photons at once and stop the generating photons at once, so that an object no longer has a breakup at a split line (the breakup is conspicuous when a white vertical bar is moved sideways) during sequential photon generation. Furthermore, a resetting period having a sufficient duration can be secured so that occurrence of an afterimage due to change in electric characteristics of a drive transistor can be prevented.

Here, the non-display period may include a resetting period in which the drive transistor in each of all the pixels of the first display unit and the second display unit is initialized, and the resetting period may be started by the driver unit, in each of all the pixels of the first display unit and the second display unit, causing non-conduction of the third switching transistor through the control line and causing conduction of the first switching transistor through the scanning line to apply a constant potential of the second power supply line to the source electrode of the drive transistor through the luminescence element and apply the predetermined reference potential to the gate electrode of the drive transistor, and terminated by the driver unit, in each of all the pixels of the first display unit and the second display unit, causing conduction of the third switching transistor through the control line to apply the signal voltage held by the first capacitor between the gate electrode and the source electrode of the drive transistor.

Furthermore, the non-display period may include a resetting period in which the drive transistor in each of all the pixels of the first display unit and the second display unit is initialized, and the resetting period may be started by the driver unit applying a reset voltage to the data line and turning the first switching transistor and the second switching transistor conductive through the scanning line so that the reset voltage is applied to the source electrode of the drive transistor and the predetermined reference potential is applied to the gate electrode of the drive transistor, and terminated by the driver unit turning the third switching transistor conductive through the control line so that the signal voltage held by the first capacitor is applied between the gate electrode and the source electrode of the drive transistor.

Furthermore, the non-display period may include a signal voltage writing period in which, in each of all the pixels of the first display unit and the second display unit, the first capacitor is caused to hold a signal voltage while the third switching transistor is non-conductive, and in the signal voltage writing period, the driver unit is configured to cause conduction of the first switching transistor and conduction of the second switching transistor in each of the pixels in each of the rows through the scanning line provided for the row, and cause the first capacitor in each of the pixels to hold a signal voltage transmitted from the data line provided for one of the columns which includes the pixel, so that the first capacitor of each of all the pixels of the first display unit and the second display unit is caused to hold the signal voltage.

Furthermore, the signal voltage writing period may be controlled by the driver unit so that the signal voltage writing period overlaps the resetting period at least in part.

Furthermore, the signal voltage writing period may be controlled by the driver unit so that the signal voltage writing period is included in the resetting period.

A preferred embodiment of the present invention is hereinafter described on the basis of the drawings. Elements which are common or equivalent among all the drawing are hereinafter denoted by the same symbol, and thus a description thereof is omitted.

Embodiment

An embodiment of the present invention shall be described below with reference to the drawings.

Figure 2:
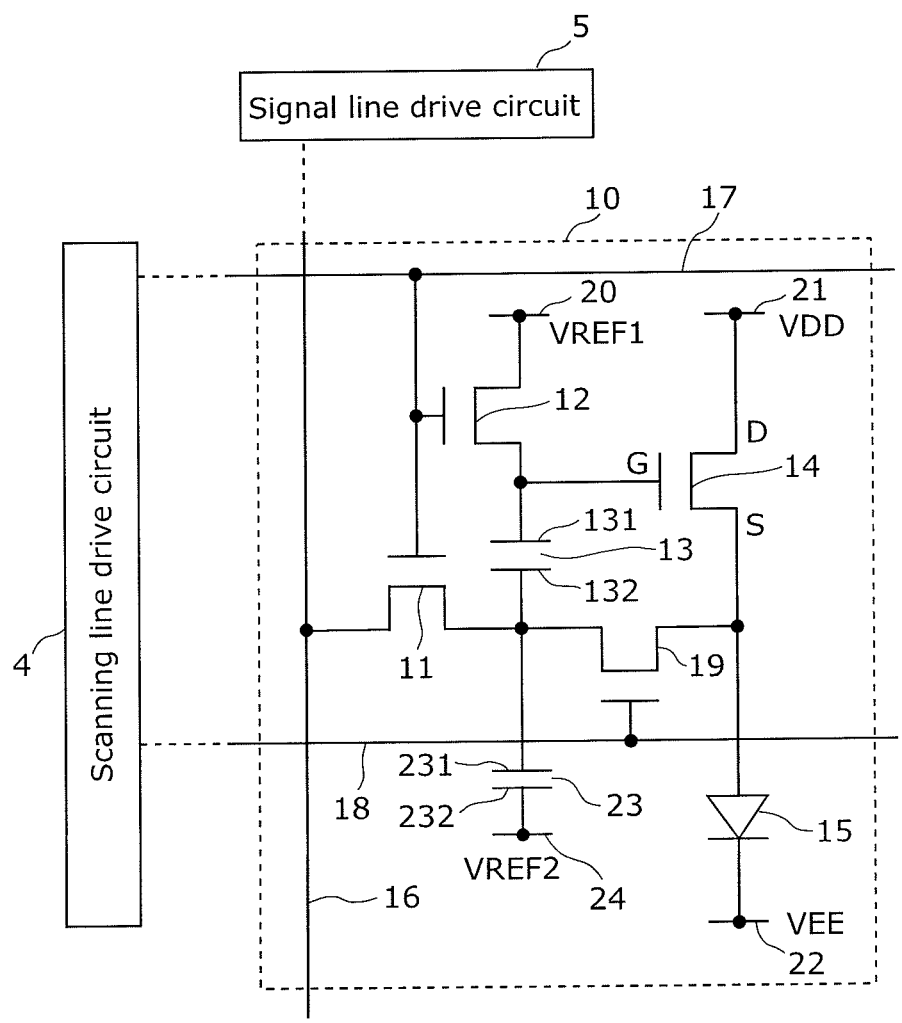
FIG. 2 is a diagram showing a circuitry configuration of a pixel of a display unit according to the embodiment of the present invention, and connection of the pixel with peripheral circuitry thereof.

FIG. 1 is a block diagram showing an electrical configuration of a display device according to an embodiment of the present invention. FIG. 2 is a diagram showing a circuitry configuration of a pixel of the display unit according to the embodiment of the present invention, and connection of the pixel with peripheral circuitry thereof. It should be noted that FIG. 2 shows a circuitry configuration of one of pixels 10 and connection of the pixel 10 with peripheral circuitry thereof.

As shown in FIG. 1, a display device 1 includes a control circuit 2, a memory unit 3, a scanning line drive circuit 4, a signal line drive circuit 5a, a signal line drive circuit 5b, and a display unit 6. The display unit 6 is composed of an upper display part 6a and a lower display part 6b, which are driven by the signal line drive circuit 5a shown above the display unit 6 and the signal line drive circuit 5b shown below the display unit 6, respectively.

To put it another way, the display unit 6 has the upper display part 6a, which corresponds to a first display unit in the present invention, and the lower display part 6b, which corresponds to a second display unit in the present invention.

The upper display part 6a and the lower display part 6b each have a plurality of the pixels 10 and display an image according to an image signal input to the display device 1 from an external source. Specifically, each of the upper display part 6a and the lower display part 6b includes the pixels 10 arranged in rows and columns, scanning lines 17 and scanning lines 18 provided for the respective rows of the pixels 10, signal lines 16 provided for the respective columns of the pixels 10, a positive power supply line 21 and a negative power supply line 22 for power supply to the respective pixels 10.

The control circuit 2 drives the upper display part 6a and the lower display part 6b. Specifically, the control circuit 2 controls the scanning line drive circuit 4, the signal line drive circuit 5a, the signal line drive circuit 5b, and the memory unit 3 to cause them to dive the upper display part 6a and the lower display part 6b. The memory unit 3 stores correction data for the respective pixels. The control circuit 2 reads the correction data stored in the memory unit 3, corrects an image signal input from an external sources based on the correction data, and outputs the corrected image signal to the signal line drive circuit 5.

The scanning line drive circuit 4 is controlled by the control circuit 2. The scanning line drive circuit 4 is connected to the scanning line 17 and the scanning line 18, and outputs scanning signals to the scanning line 17 and the scanning line 18 so as to control conductivity of a switching transistor 11, a switching transistor 12, and a switching transistor 19 included in each of the pixels 10.

The signal line drive circuit 5a and the signal line drive circuit 5b drive the upper display part 6a and the lower display part 6b, respectively, under control of the control circuit 2. Specifically, each of the signal line drive circuit 5a and the signal line drive circuit 5b is connected to the signal line 16 and outputs a signal voltage according to an image signal to the pixel 10 under control of the control circuit 2. It is sufficient that the signal line drive circuit 5a and the signal line drive circuit 5b are functionally independent of each other and drive the upper display part 6a and the lower display part 6b, respectively. It is also possible to drive the upper display part 6a and the lower display part 6b through the signal line drive circuit 5 as a single unit.

The pixel 10 includes the switching transistors 11, 12, and 19, electrostatic holding capacitors 13 and 23, a drive transistor 14, an organic EL element 15, the signal line 16, the scanning lines 17 and 18, reference power supply lines 20 and 24, the positive power supply line 21, and the negative power supply line 22 as shown in FIG. 2. The peripheral circuitry includes the scanning line drive circuit 4 and the signal line drive circuit 5 (the signal line drive circuit 5a and the signal line drive circuit 5b).

The switching transistor 11, which is an example of a second switching transistor in the present invention, has a gate connected to the scanning line 17 and switches conduction and non-conduction between the signal line 16 and an electrode 132, which is one of the electrodes of the electrostatic holding capacitor 13. Specifically, the switching transistor 11 is a second switching transistor having a gate connected to the scanning line 17, and a source and a drain one of which is connected to the signal line 16 and the other of which is connected to the electrode 132 of the electrostatic holding capacitor 13. The switching transistor 11 controls conductivity between the signal line 16 and the electrode 132 of the electrostatic holding capacitor 13 so as to cause the electrostatic holding capacitor 13 to hold a desired voltage of the signal line 16.

The switching transistor 12, which is an example of a first switching transistor in the present invention, has a gate connected to the scanning line 17 and switches conduction and non-conduction between the gate of the drive transistor 14 and the reference power supply line 20 which supplies a predetermined reference potential VREF1. Specifically, the switching transistor 12 is a first switching transistor having a gate connected to the scanning line 17, and a source and a drain one of which is connected to the reference power supply line 20 and the other of which is connected to an electrode 131 of the electrostatic holding capacitor 13. The switching transistor 12 determines timing with which the reference voltage VREF1 of the reference power supply line 20 is applied to the electrode 131 of the electrostatic holding capacitor 13. The switching transistors 11 and 12 are, for example, N-type thin film transistors (N-type TFT) but are alternatively P-type thin film transistors (P-type TFT).

The electrostatic holding capacitor 13, which is an example of a first capacitor in the present invention, has electrodes one of which is an electrode 131 connected to the gate of the drive transistor. Specifically, the electrostatic holding capacitor 13 is a first capacitor having electrodes one of which is the electrode 131 connected to the gate of the drive transistor 14, and the other of which is the electrode 132 connected to the source of the drive transistor 14 via the switching transistor 19. The electrostatic holding capacitor 13 holds a voltage corresponding to a signal voltage provided from the signal line 16. For example, the electrostatic holding capacitor 13 stabilizes a gate-source electrode potential of the drive transistor 14 after the switching transistors 11 and 12 turn OFF (non-conductive) and the switching transistor 19 turns ON (conductive), and thereby stabilizes current provided from the drive transistor 14 to the organic EL element 15.

The electrostatic holding capacitor 23, which is an example of a second capacitor in the present invention, has electrodes one of which is an electrode 231 connected to the electrode 132 of the electrostatic holding capacitor 13, and the other of which is an electrode 232 connected to the reference power supply line 24 which provides a predetermined reference potential. With the electrode 232 connected to a fixed reference voltage VREF2 of the reference power supply line 24, the electrostatic holding capacitor 23 reduces change in the potential VREF1 held at the first electrode 131 of the electrostatic holding capacitor 13 by the electrostatic holding capacitor 13 and the electrostatic holding capacitor 23, even after the switching transistor 11 and the switching transistor 12 turn from ON (conductive) to OFF (non-conductive). In other words, the electrostatic holding capacitor 23 stabilizes the voltage applied to the gate electrode of the drive transistor 14 at VREF1 even when the switching transistor 11 and the switching transistor 12 turn OFF (non-conductive).

The drive transistor 14, which is an example of the drive transistor in the present invention, has a source connected to the organic EL element 15 and a drain connected to the positive power supply line 21. Specifically, the drive transistor 14 is a drive transistor having a drain connected to the positive power supply line 21, which is the first power supply line, and a source connected to the anode of the organic EL element 15. The drive transistor 14 is a voltage-current converting element which converts a voltage applied between the gate and the source to a drain current corresponding to the voltage. Subsequently, the drive transistor 14 supplies the drain current, as a signal current, to the organic EL element 15. The drive transistor 14 is, for example, an N-type thin film transistor (N-type TFT). The drive transistor 14 may include a semiconductor layer including an amorphous silicon film or a crystalline silicon layer crystallized by laser-annealing an amorphous silicon film, or may include a semiconductor layer formed of an oxide of an alloy including a material such as In or Zn.

The organic EL element 15, which is an example of a luminescence element in the present invention, has an electrode (cathode) connected to the negative power supply line 22. Specifically, the organic EL element 15 is a luminescence element having a cathode connected to the negative power supply line 22, which is a second power supply line. The signal current under control of the drive transistor 14 flows into the organic EL element 15, and the organic EL element 15 thereby generates photons.

The switching transistor 19, which is an example of a third switching transistor in the present invention, has a gate connected to the scanning line 18 and switches conduction and non-conduction between the electrode 132 of the electrostatic holding capacitor 13 and the source of the drive transistor 14. Specifically, the switching transistor 19 is a third switching transistor having a gate connected to the scanning line 18, and a source and a drain one of which is connected to the source of the drive transistor 14 and the other of which is connected to the electrode 132 of the electrostatic holding capacitor 13. The switching transistor 19 determines timing with which the organic EL element 15 starts generating photons, by applying a potential held by the electrostatic holding capacitor 13 between the gate electrode and the source electrode of the drive transistor 14. The switching transistor 19 is, for example, an N-type thin film transistor (N-type TFT) but is alternatively a P-type thin film transistor (P-type TFT).

The signal line 16, which is an example of a data line in the present invention, is provided for each of the columns of the pixels 10. Specifically, the signal line 16 is connected to the signal line drive circuit 5 (the signal line drive circuit 5a or the signal line drive circuit 5b) and to the respective pixels 10 included in the pixel column, and supplies signal voltage which determines luminescence intensity.

The scanning line 17, which is an example of a scanning line in the present invention, is provided for each of the rows of the pixels 10. Specifically, the scanning line 17 is connected to the scanning line drive circuit 4, and is connected to the respective pixels 10 included in the pixel row. With this, the scanning line 17 determines timing with which the signal voltage is written in the respective pixels 10 included in the pixel row, and determines, by applying the reference voltage VREF1 to the gate of the drive transistor 14 included in each of the pixels 10, timing with which the organic EL element 15 stop generating photons.

The scanning line 18, which is an example of a control line in the present invention, is provided for each of the rows of the pixels 10. Specifically, the scanning line 18 is connected to the scanning line drive circuit 4 and transfers the potential of the electrode 132 of the electrostatic holding capacitor 13 to the source of the drive transistor 14. With this, the scanning line 18 determines timing with which the organic EL element 15 starts generating photons, by applying a luminance signal voltage held between the electrodes of the electrostatic holding capacitor 13 between the gate electrode and the source electrode of the drive transistor 14.

The display device 1 thus includes as many the scanning lines 17 as the rows of the pixels and as many the scanning lines 18 as the rows of the pixels.

The reference power supply line 20, which is an example of a first reference potential line in the present invention, provides a predetermined reference potential. Specifically, the reference power supply line 20 is connected to the electrode 131 of the electrostatic holding capacitor 13 and provides the reference voltage VREF1, which determines a voltage value of the electrode 131 of the electrostatic holding capacitor 13. VREF1 is set at a voltage at which the drive transistor 14 is OFF from when the scanning line 17 causes conduction of the switching transistor 12 to when the scanning line 18 causes conduction of the switching transistor 19.

The reference power supply line 24, which is an example of a second reference potential line in the present invention, provides a predetermined reference potential. Specifically, the reference power supply line 24 is connected to the electrode 232 of the electrostatic holding capacitor 23 and provides the reference voltage VREF2, which determines a voltage value of the electrode 232 of the electrostatic holding capacitor 23. The reference power supply line 24 is required to stabilize voltage of the gate electrode of the drive transistor 14 only from immediately before when the scanning line 17 causes conduction of the switching transistor 11 and conduction of the switching transistor 12 until immediately before when the scanning line 18 causes conduction of the switching transistor 19. The reference power supply line 24 may be supplied with power from a dedicated power source or through the positive power supply line 21, the negative power supply line 22, the reference power supply line 20, or the scanning line 18 of the respective pixels 10.

The positive power supply line 21, which is an example of the first power supply line in the present invention, is connected to the drain of the drive transistor 14 and determines potential of the drain of the drive transistor 14 (VDD).

The negative power supply line 22, which is an example of the second power supply line in the present invention, is connected to the cathode of the organic EL element 15 and determines potential of the cathode of the organic EL element 15.

The display device 10 is configured as described above.

It should be noted that, although not shown in FIG. 1 or FIG. 2, the reference power supply line 20, the reference power supply line 24, and the positive power supply lines 21 and 22 are connected also to the other pixels and a voltage source. The positive power supply lines 21 and 22 are the first power supply line and the second power supply line, respectively.

Next, a method of controlling the display device 1 according to the present embodiment shall be described.

Figure 3A:
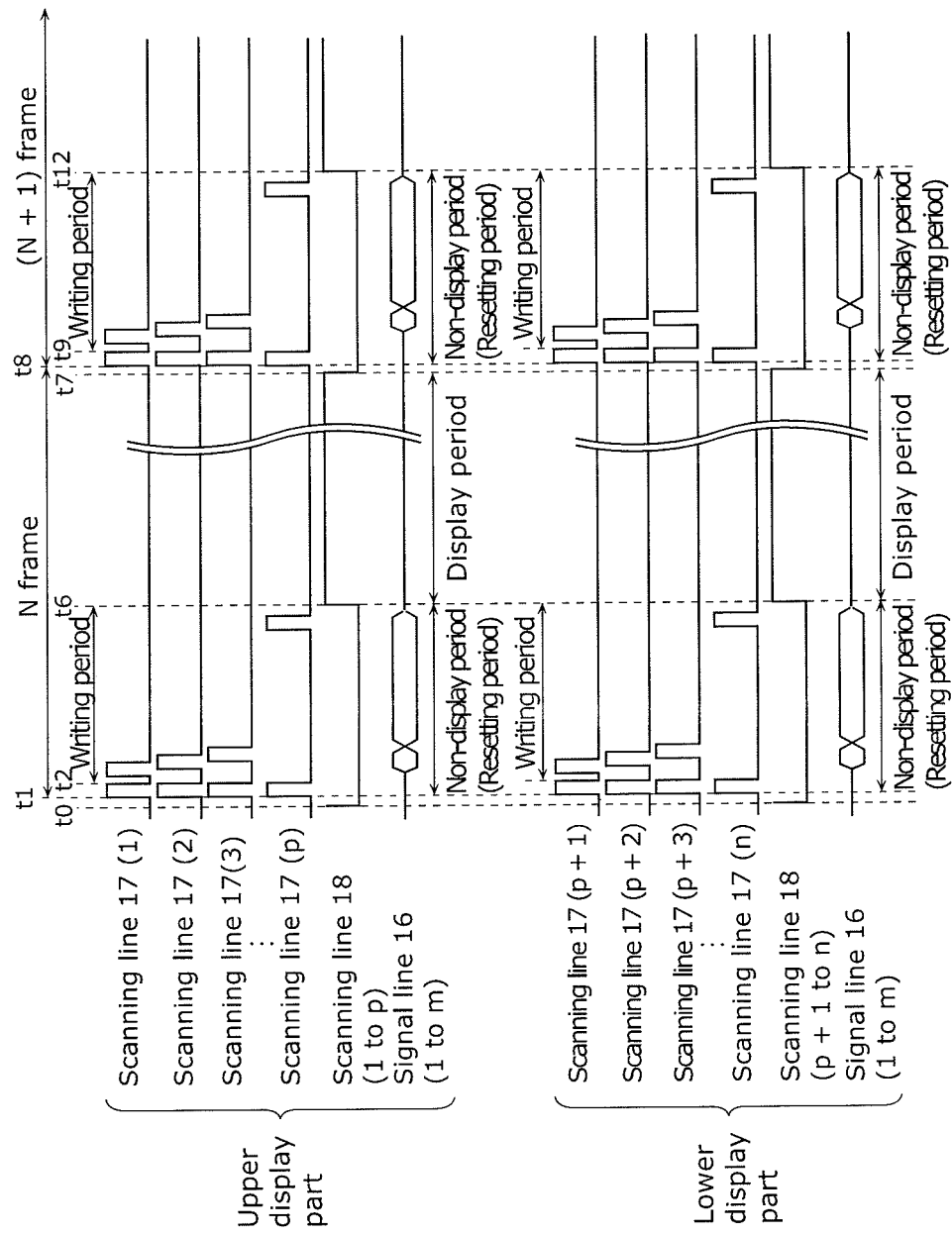
FIG. 3A shows an example of an operation timing chart for the display device according to the embodiment of the present invention.

FIG. 3A is an example of an operation timing chart for the display device according to the embodiment of the present invention. In FIG. 3A, the horizontal axis represents time. The waveforms in the upper half of the timing chart represent voltages generated in the scanning lines 17 of all the rows of the pixels 10 of the upper display part 6a, voltages generated in the scanning lines 18 thereof, and voltages generated in the signal lines 16 of all the columns of the pixels 10, from top to bottom. The waveforms in the lower half of the timing chart represent voltages generated in the scanning lines 17 of all the rows of the pixels 10 of the upper display part 6b, voltages generated in the scanning lines 18 thereof, and voltages generated in the signal lines 16 of all the columns of the pixels 10, from top to bottom. The pixels 10 of the display unit 6 are arranged in n rows and m columns, where the pixels 10 of the upper display part 6a are arranged in p rows and m columns. In FIG. 3A, the respective scanning lines 17 of the rows of the pixels 10 of the upper display part 6a are represented as a scanning line 17 (1) to a scanning line 17 (p), the scanning lines 18 are represented as scanning lines 18 (1 to p), and the signal lines 16 are represented as signal lines 16 (1 to m). Similarly, for the lower display part 6b, the respective scanning lines 17 are represented as a scanning line 17 (p+1) to a scanning line 17 (n), the scanning lines 18 are represented as scanning lines 18 (p+1 to n), and the signal lines 16 are represented as signal lines 16 (1 to m).

Here, a characteristic method of controlling the display device shown in FIG. 3A shall be as described below.

The control circuit 2 causes non-conduction of the switching transistor 19 in each of all the pixels 10 of the upper display part 6a through the scanning lines 18 (1 to p) and the lower display part 6b through the scanning lines 18 (p+1 to n) (at a time point t0 in FIG. 3A), and causes conduction of the switching transistor 12 in each of all the pixels 10 at the same time through the scanning line 17 (1) to the scanning line 17 (n) (at a time point t1 in FIG. 3A) to apply a predetermined reference potential to the gate of the drive transistor 14. All the pixels 10 (organic EL elements 15) thereby stop generating photons at the same time so that a non-display period is started (from a time point t1).

The control circuit 2 also causes conduction of the switching transistor 19 in each of all the pixels 10 through the scanning lines 18 (1 to p) and the scanning line 18 (p+1 to n) at the same time (at a time point t6 in FIG. 3A) to apply a signal voltage held by the electrostatic holding capacitor 13 between the gate and the source of the corresponding drive transistor 14. All the pixels 10 (organic EL elements 15) thereby start generating photons at the same time so that a display period is stared.

The non-display period includes a resetting period in which the drive transistor 14 in each of all the pixels 10 of the upper display part 6a and the lower display part 6b is initialized. Typically, a non-display period is identical with a resetting period.

In the present embodiment shown in FIG. 3A, the resetting period is started by the control circuit 2, in each of all the pixels 10 of the upper display part 6a and the upper display part 6b, causing non-conduction of the switching transistor 19 through the scanning lines 18 (1 to p) and the scanning lines 18 (p+1 to n) (from the time point t0 in FIG. 3A) and causing conduction of the switching transistor 12 through the scanning line 17 (1) to the scanning line 17 (n) (from the time point t1 in FIG. 3A) to apply a constant potential of the negative power supply line 22 to the source of the drive transistor 14 through the organic EL element 15 and apply a predetermined reference potential to the gate of the drive transistor 14. It should be noted that, in the present invention, the switching transistor 19 in each of the pixels 10 does not need to be non-conductive in an early period of the resetting period, which will be described later with reference to FIG. 3B. The resetting period is terminated by the control circuit 2 causing conduction of the switching transistor 19 in each of all the pixels 10 through the scanning lines 18 (1 to p) and the scanning lines 18 (p+1 to n) to apply a signal voltage held by the electrostatic holding capacitor 13 (VREF1−Vdata) between the gate and the source of the drive transistor 14.

Furthermore, the non-display period includes a writing period in which, sequentially through all the pixels 10 of the upper display part 6a and the lower display part 6b, the electrostatic holding capacitor 13 in each of the pixels is caused to hold a signal voltage while the switching transistor 19 is non-conductive.

In the writing period, the control circuit 2 sequentially causes conduction of the switching transistor 12 and conduction of the switching transistor 11 in each of the pixels 10 in each of the rows of the pixels 10 of the upper display part 6a and the lower display part 6b through the scanning line 17 (x) provided for the rows in the upper display part 6a and the lower display part 6b (at a time point t3), and causes the electrostatic holding capacitor 13 in the pixel 10 to hold a signal voltage transmitted from the signal line 16 provided for one of the columns which includes the pixel 10, so that the electrostatic holding capacitor 13 of each of all the pixels 10 of the upper display part 6a and the lower display part 6b is caused to hold the signal voltage.

Here, the control circuit 2 controls the writing period so that the writing period is included in at least part of the resetting period as shown in FIG. 3A. Typically, a writing period is included in a resetting period.

It should be noted that a writing period may be controlled using a scanning method other than the method of sequential scanning as described above, in which the switching transistor 12 and the switching transistor 11 in each of all the pixels 10 are made conductive sequentially on a row basis and the electrostatic holding capacitor 13 in each of all the pixels 10 is sequentially caused to hold a signal voltage. For example, a writing period may be controlled using a scanning method in which the order in which the electrostatic holding capacitor 13 in each of the pixels 10 is caused to hold a signal voltage may be switched on a row basis. In the case where a writing period may be controlled using the scanning method in which the order in which the electrostatic holding capacitor 13 in each of the pixels 10 is caused to hold a signal voltage may be switched on a row basis, when the order of signal voltages to be transmitted from the signal line 16 is changed so that the order of transmission of data to the signal lines 16 is changed to, for example, the third row, the fifth row, the first row, the second row, and then the fourth row in sequence, the scanning lines 17 are accordingly turned ON in a sequence of the scanning line 17 (3), the scanning line 17 (5), the scanning line 17 (1), the scanning line 17 (2), and then the scanning line 17 (4). Furthermore, the order of transmission of data to the signal lines 16 and the order in which the scanning lines 17 are turned ON may be changed frame by frame in a corresponding manner.

To put it another way, in the display device according to the present embodiment which has a display area vertically split into parts for driving, control is performed so that each frame period includes a non-photon-generating period and a display period. The entire upper display part 6a and the entire lower display part 6b (the display unit 6) are caused to stop generating photons at once at the beginning of a non-photon-generating period. The entire upper display part 6a and the entire lower display part 6b (the display unit 6) are caused to start generating photons at once at the beginning of a photon-generating period.

For example, the control circuit 2 changes the voltage levels of the scanning line 17 (1) to the scanning line 17 (n) of all the pixels 10 of the upper display part 6a and the lower display part 6b (the display unit 6) from LOW to HIGH at the time point t1 so that a non-display period and a resetting period are started. Here, the resetting period is started because the change of the voltage levels of the scanning line 17 (1) to the scanning line 17 (n) from LOW to HIGH causes application of a predetermined reference potential to the gate of the drive transistor 14 and therefore the value of the source voltage of the drive transistor 14 equals the total of the voltage of the negative power supply line 22 and a positive threshold voltage of the organic EL element 15 such that a reverse-biased voltage is applied to the drive transistor 14 which is thereby initialized.

Figure 3B:
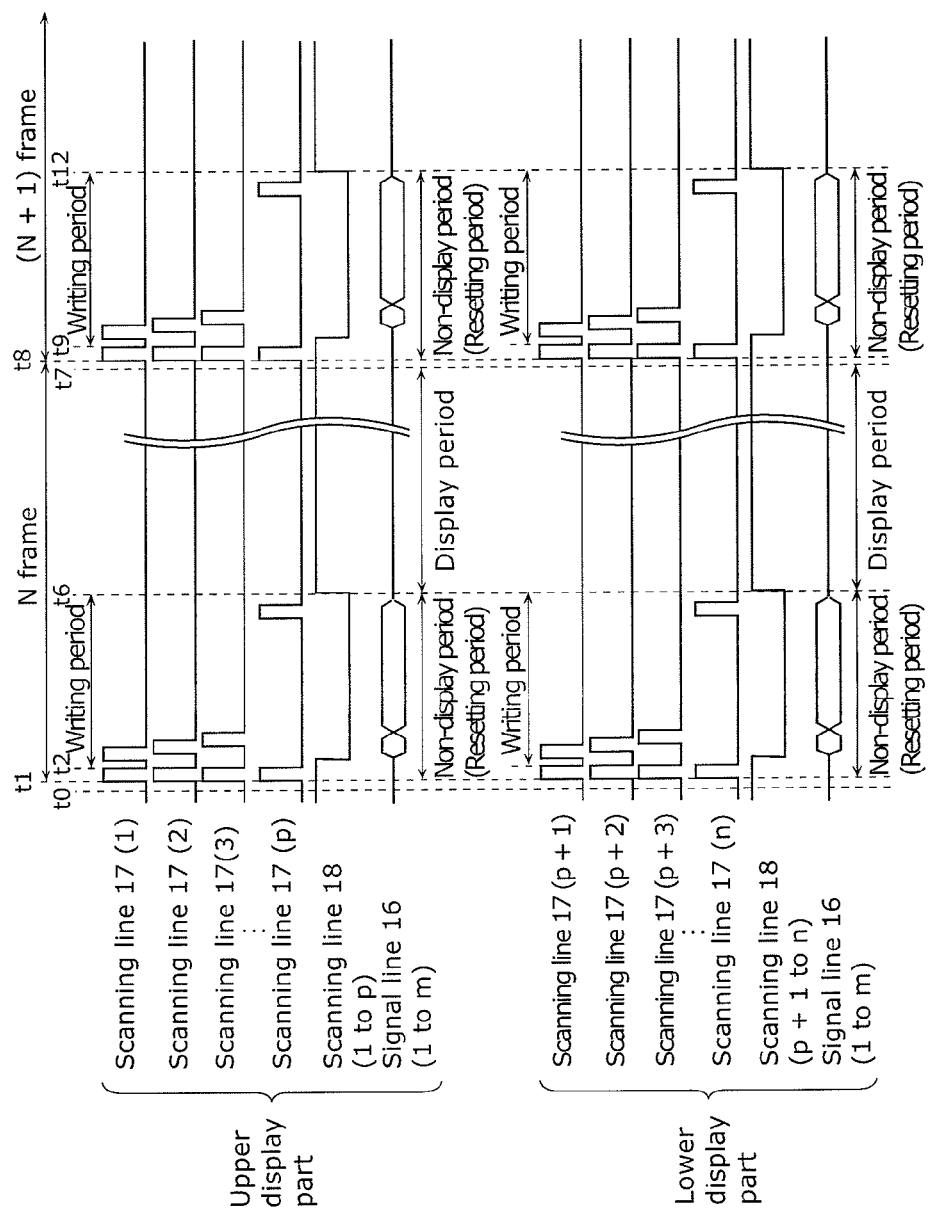
FIG. 3B shows another example of operation timing chart for the display device according to the embodiment of the present invention.

It is also possible that the switching transistor 19 in each of the pixels 10 is made conductive in an early period of the resetting period (from a time point t0 to a time point t2 in FIG. 3B) as shown in FIG. 3B. In this case, the voltage level of the scanning lines 17 (1 to p) and the scanning line 17 (p+1 to n) provided for all of the pixels 10 of the upper display part 6a and the lower display part 6b (the display unit 6) is turned HIGH in the period from the time t1 to t2 with the voltage level of the signal lines 16 (1 to m) changed from HIGH to a reset voltage Vdata0. With this, the voltage Vdata0 which is the signal voltage 16 is applied to the anode of the organic EL element 15 and the organic EL element 15 is thereby reverse-biased with a cathode voltage higher than the voltage applied to the anode, functioning also as a capacitor. The source voltage of the drive transistor is thereby stabilized at Vdata0, and VREF1 and Vdata0 are applied to the gate electrode and the source electrode of the drive transistor, respectively, so that the resetting is started. In this manner, the drive transistor 14 is quickly reset by applying a reset voltage of the signal line 16.

Next, a method of controlling the pixels 10 of the display unit 6 according to the embodiment of the present invention shall be described below using one of the pixels 10 of the upper display part 6a and the lower display part 6b as an example.

Figure 4:
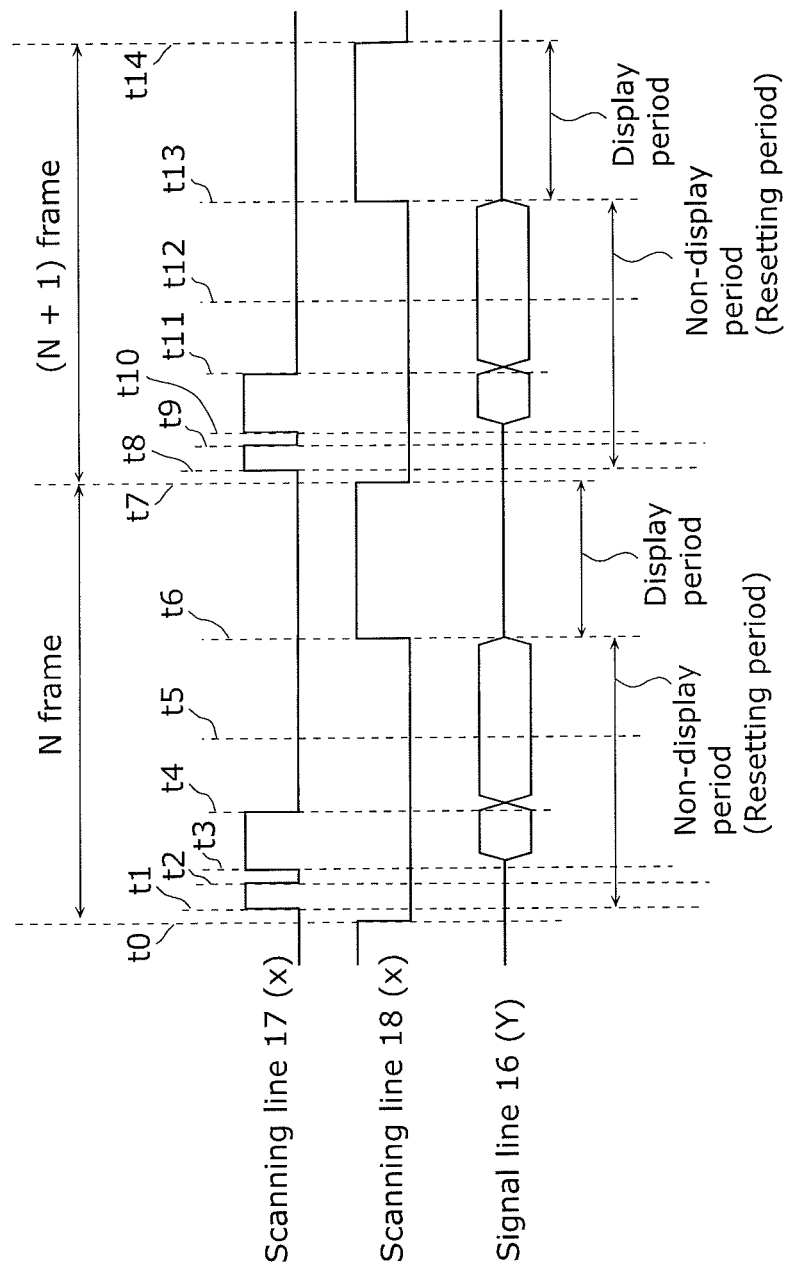
FIG. 4 is an example of an operation timing chart for control of a pixel included in the display unit according to the embodiment of the present invention.

FIG. 4 is an example of an operation timing chart for control of a pixel included in the display unit according to the embodiment of the present invention. In FIG. 4, the horizontal axis represents time. The waveforms represent voltages generated in the scanning line 17 (x), voltages generated in the scanning line 18 (x), and voltages generated in the signal line 16 of one of the pixels 10 of the upper display part 6a and the lower display part 6b, from top to bottom.

Figure 5A:
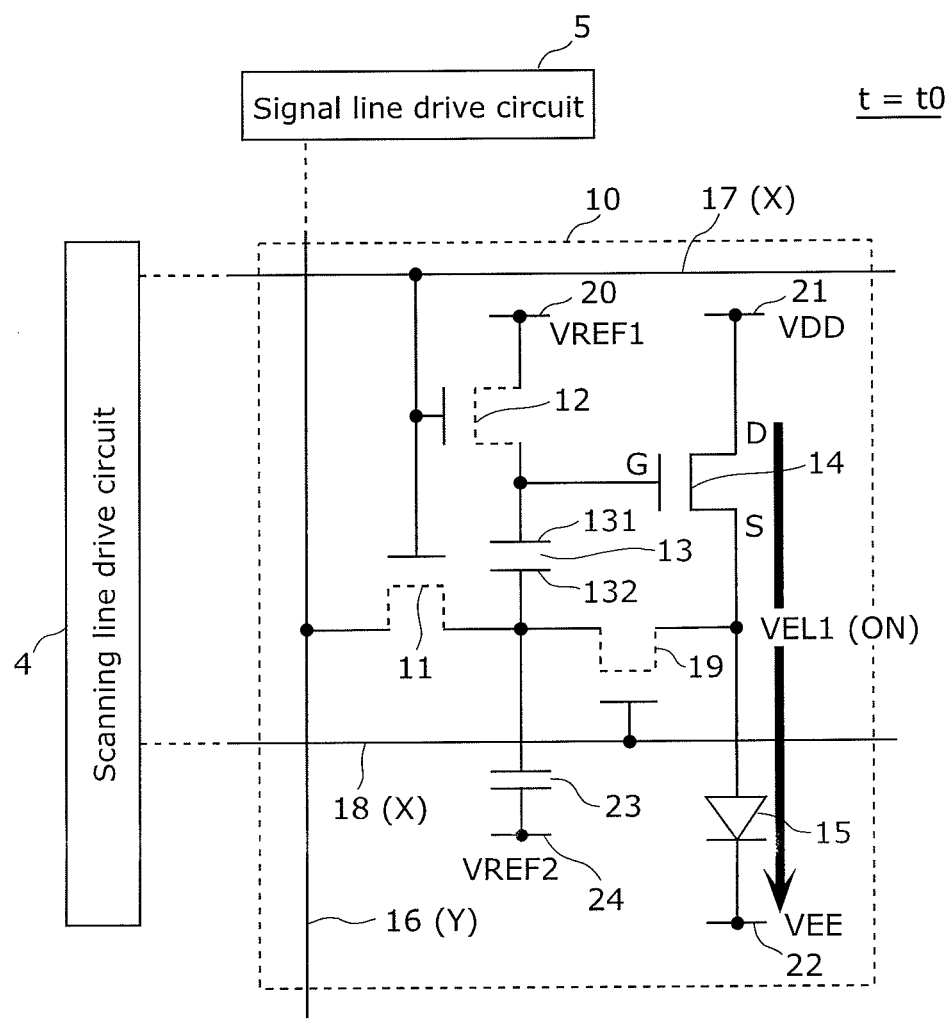
FIG. 5A is a diagram for explaining the operation timing chart for control of a pixel included in the display unit according to the embodiment of the present invention.
Figure 5B:
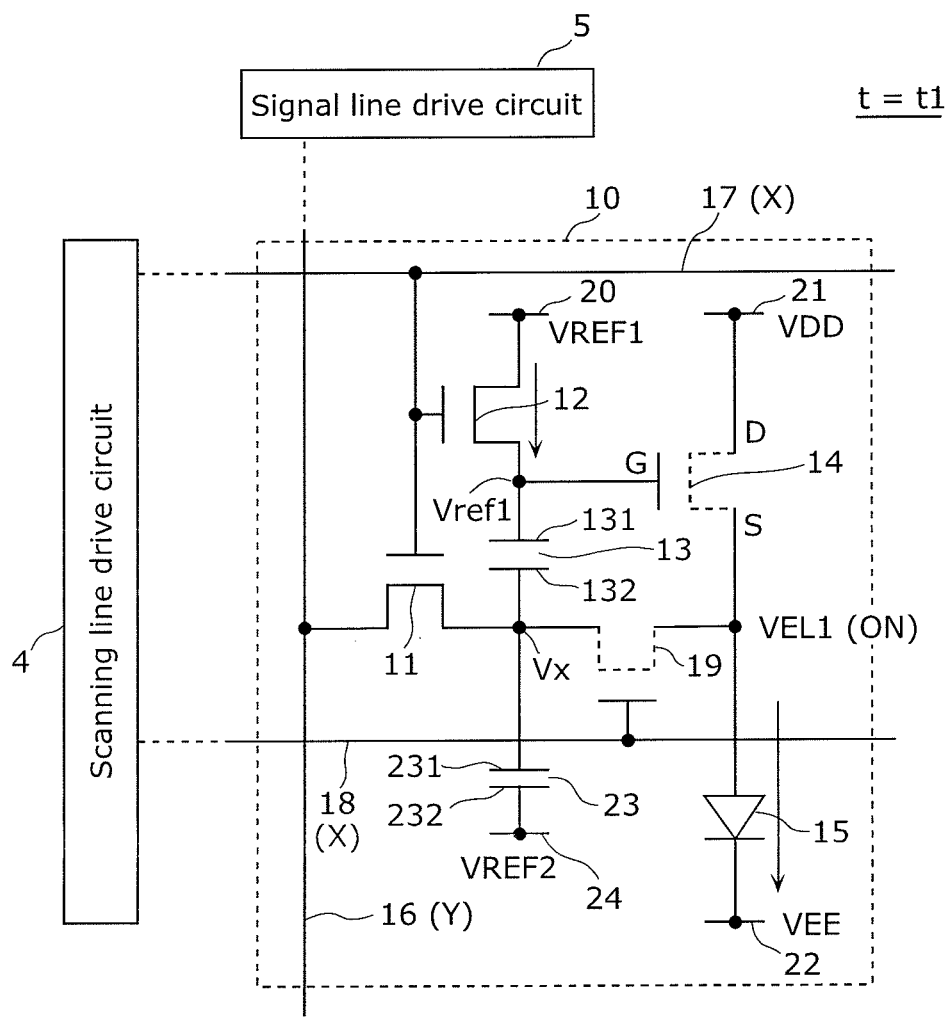
FIG. 5B is a diagram for explaining the operation timing chart for control of a pixel included in the display unit according to the embodiment of the present invention.
Figure 5C:
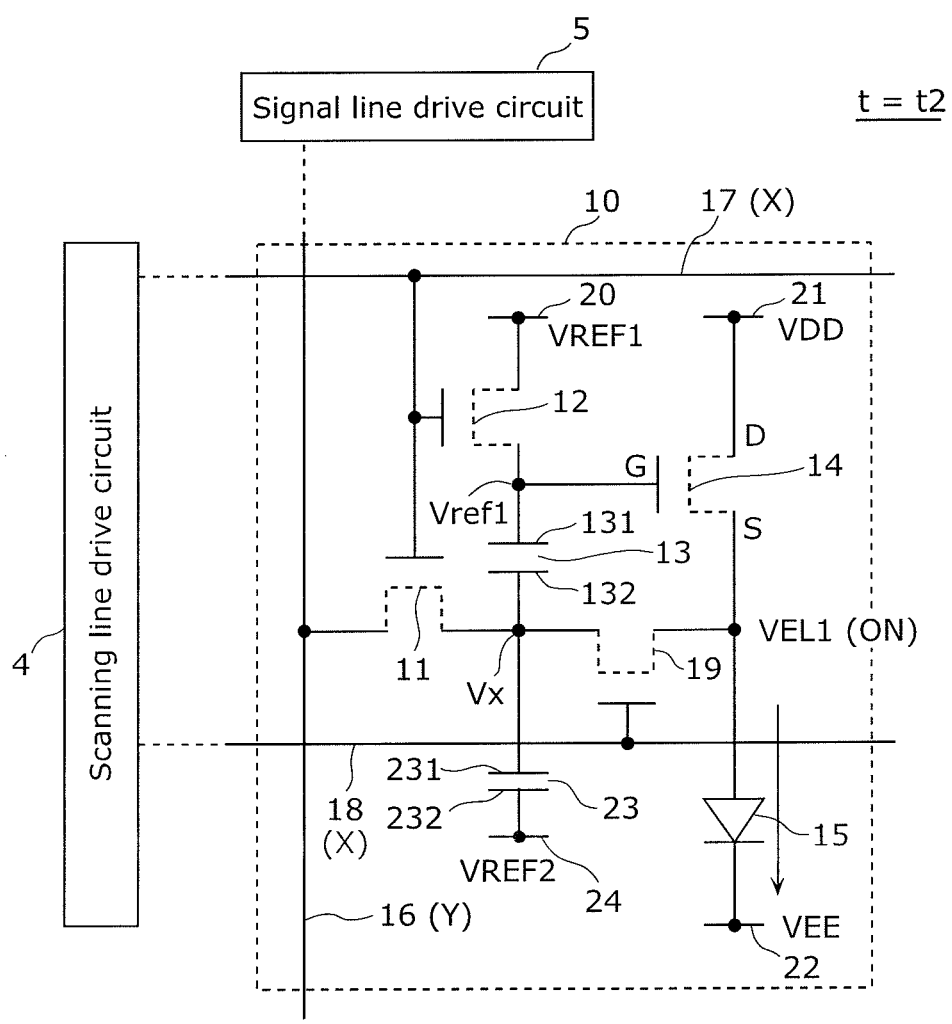
FIG. 5C is a diagram for explaining the operation timing chart for control of a pixel included in the display unit according to the embodiment of the present invention.
Figure 5D:
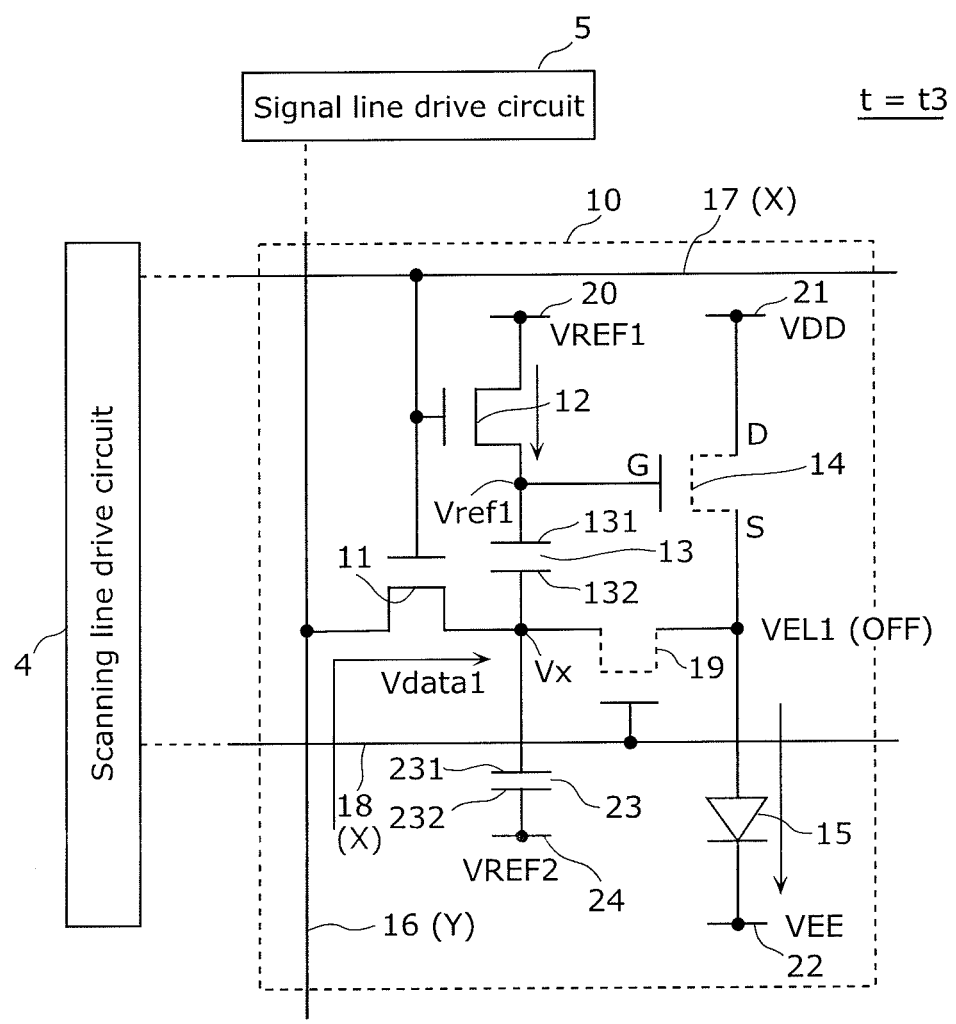
FIG. 5D is a diagram for explaining the operation timing chart for control of a pixel included in the display unit according to the embodiment of the present invention.
Figure 5E:
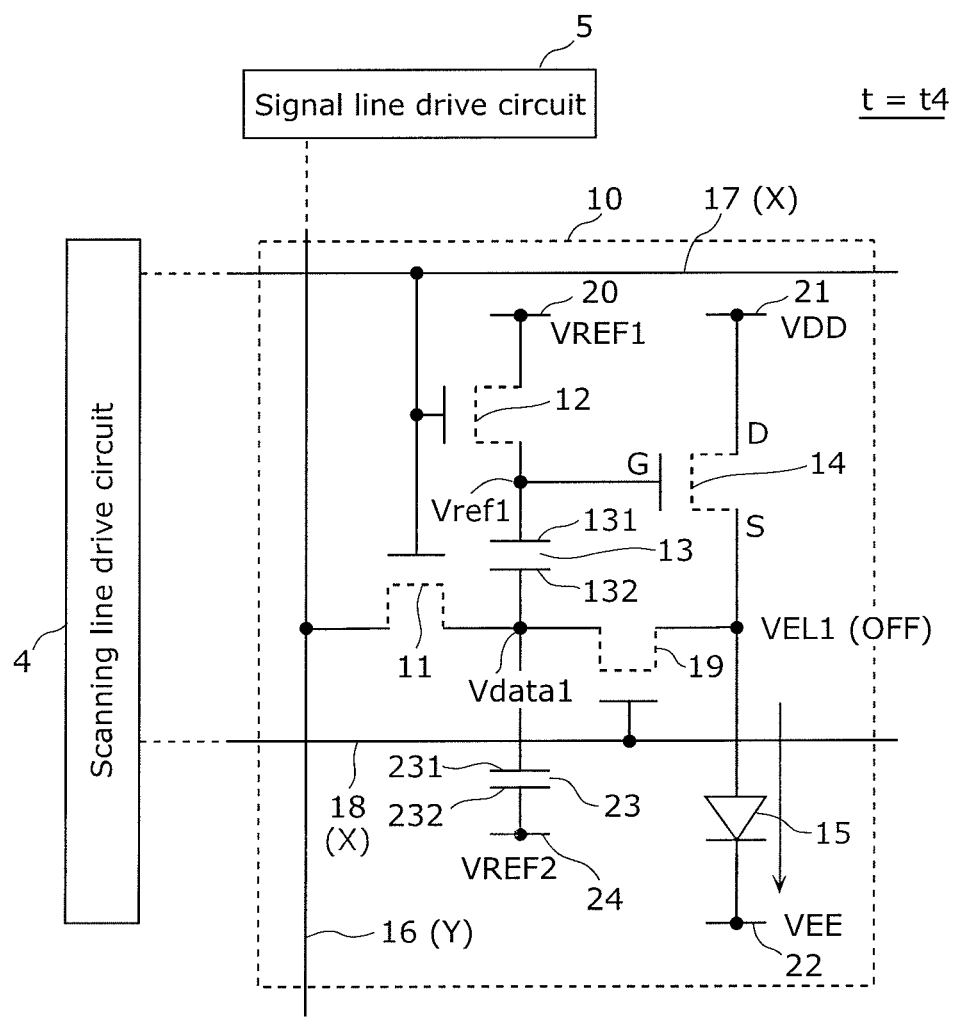
FIG. 5E is a diagram for explaining the operation timing chart for control of a pixel included in the display unit according to the embodiment of the present invention.
Figure 5F:
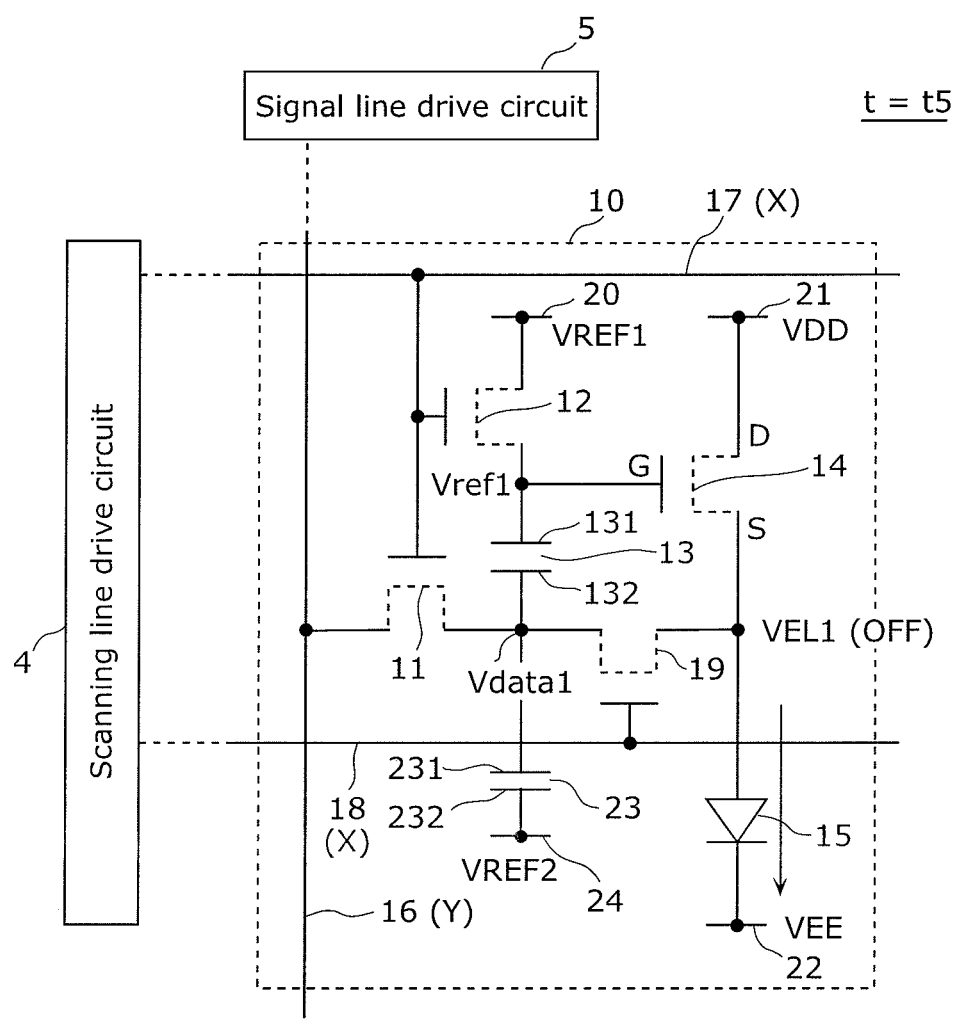
FIG. 5F is a diagram for explaining the operation timing chart for control of a pixel included in the display unit according to the embodiment of the present invention.
Figure 5G:
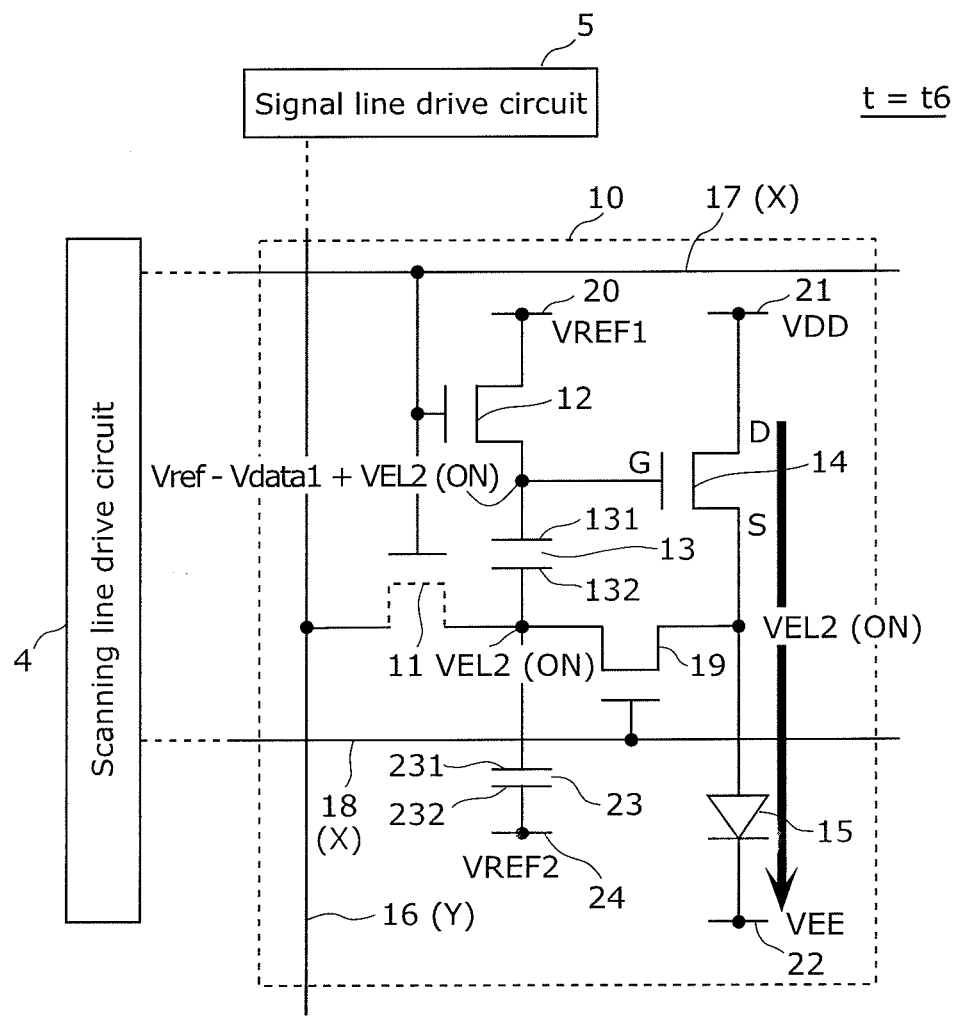
FIG. 5G is a diagram for explaining the operation timing chart for control of a pixel included in the display unit according to the embodiment of the present invention.
Figure 5H:
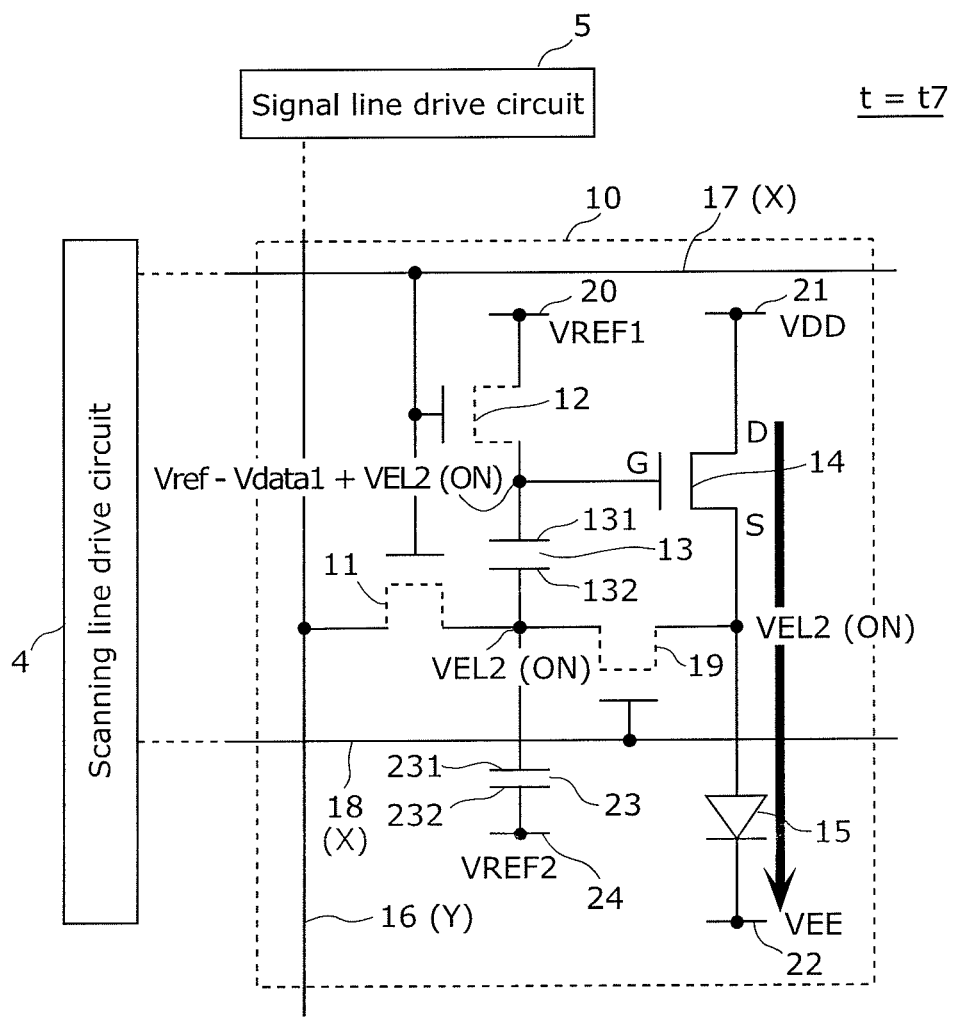
FIG. 5H is a diagram for explaining the operation timing chart for control of a pixel included in the display unit according to the embodiment of the present invention.
Figure 5I:
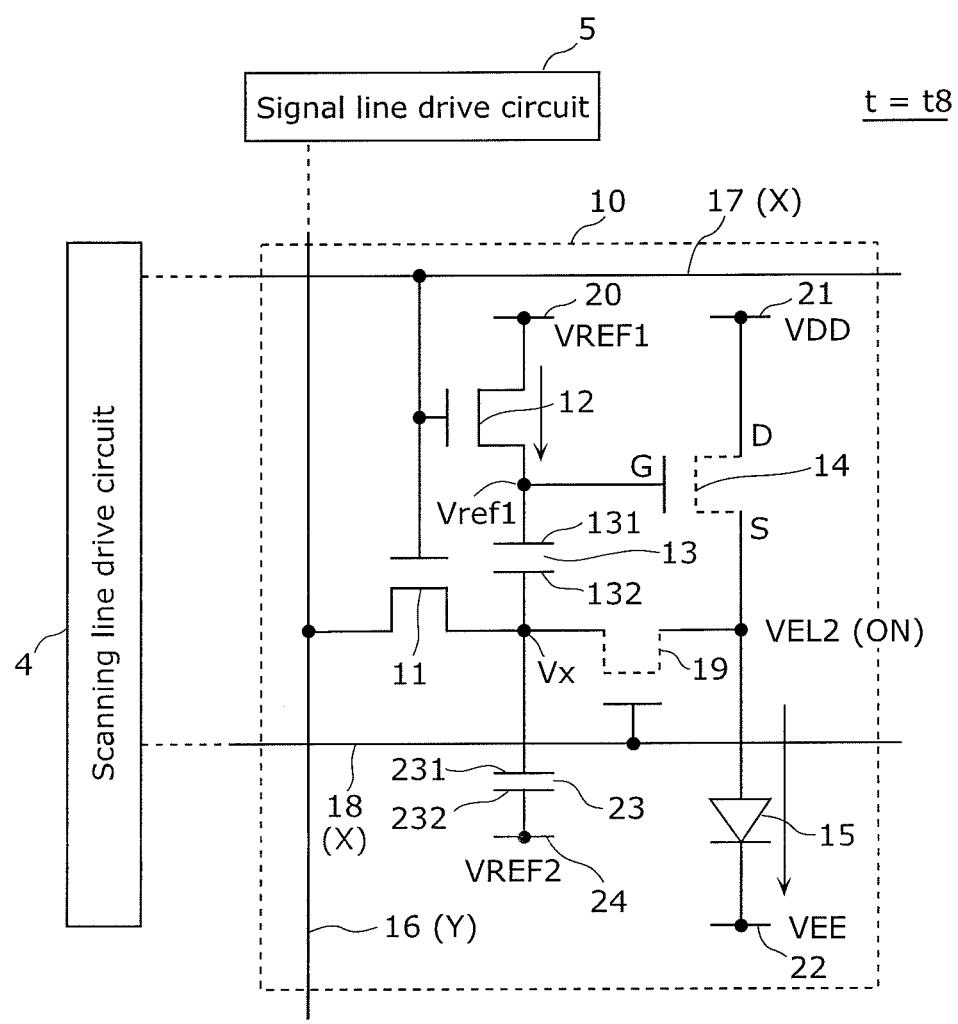
FIG. 5I is a diagram for explaining the operation timing chart for control of a pixel included in the display unit according to the embodiment of the present invention.
Figure 5J:
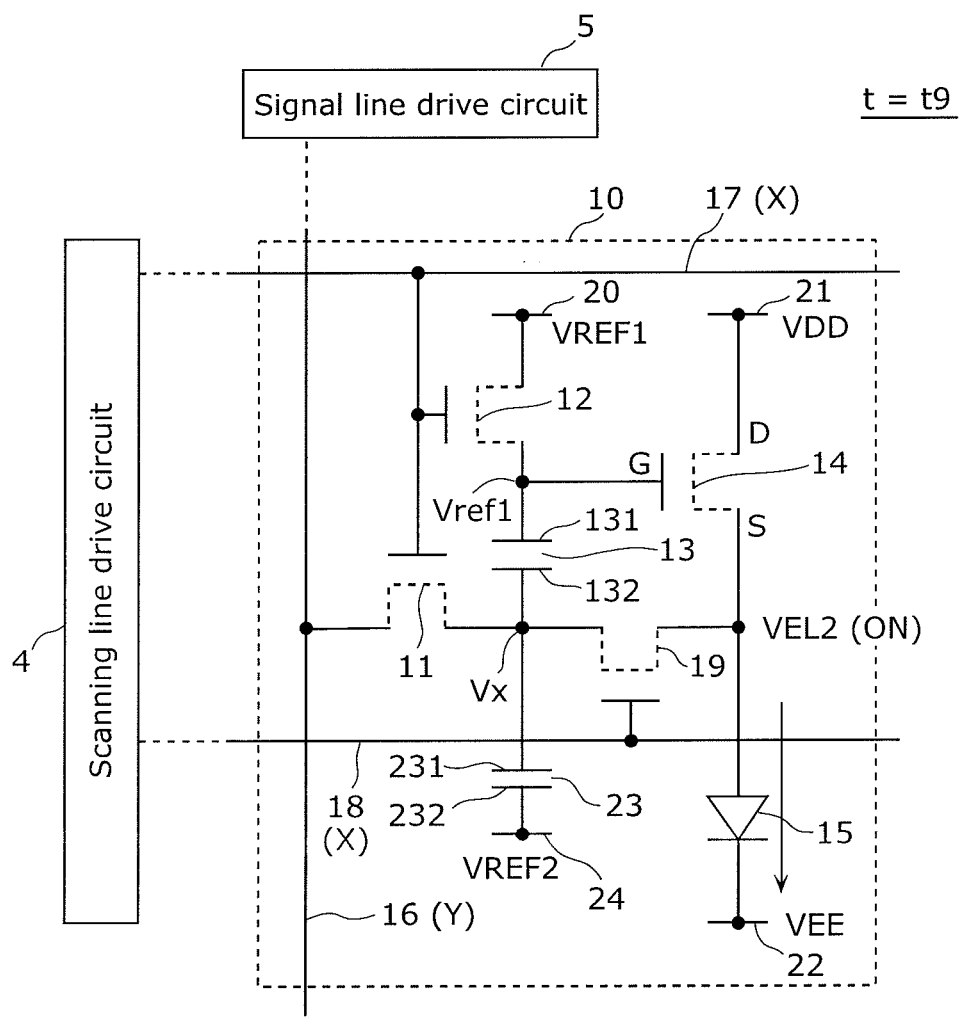
FIG. 5J is a diagram for explaining the operation timing chart for control of a pixel included in the display unit according to the embodiment of the present invention.
Figure 5K:
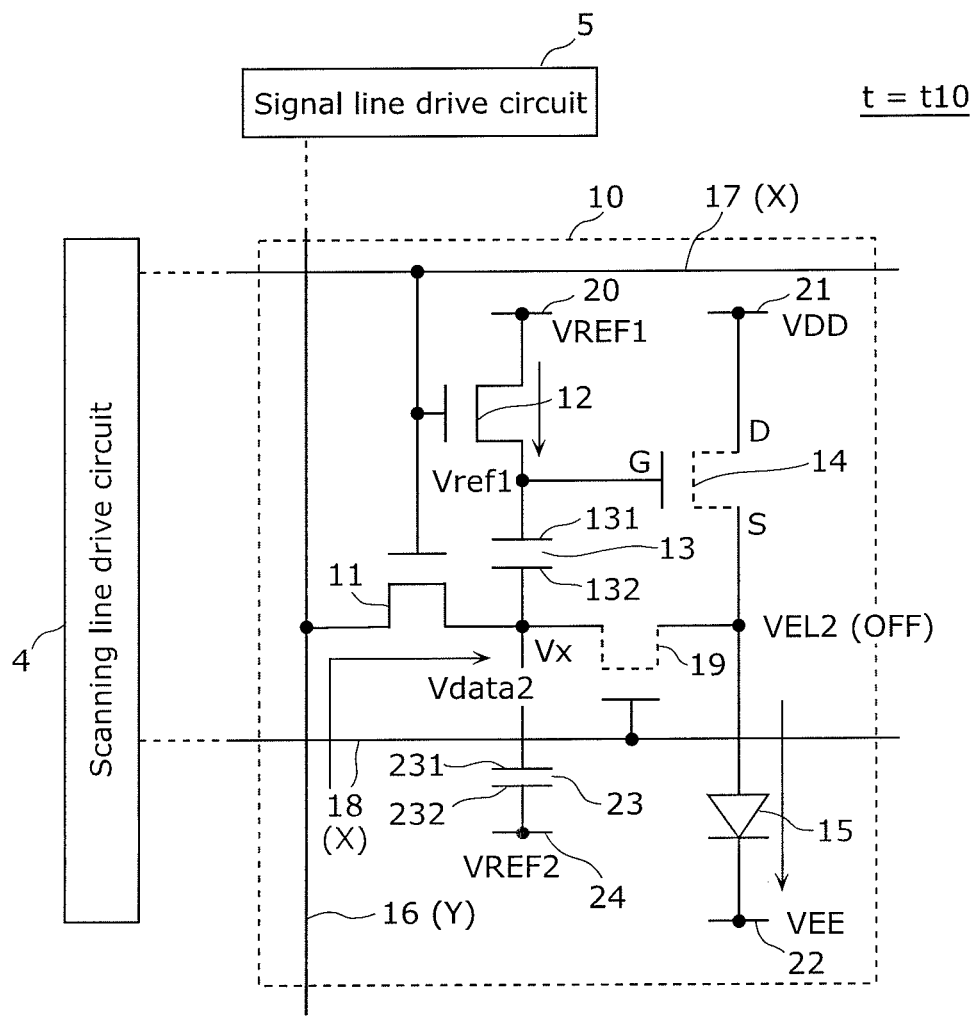
FIG. 5K is a diagram for explaining the operation timing chart for control of a pixel included in the display unit according to the embodiment of the present invention.
Figure 5L:
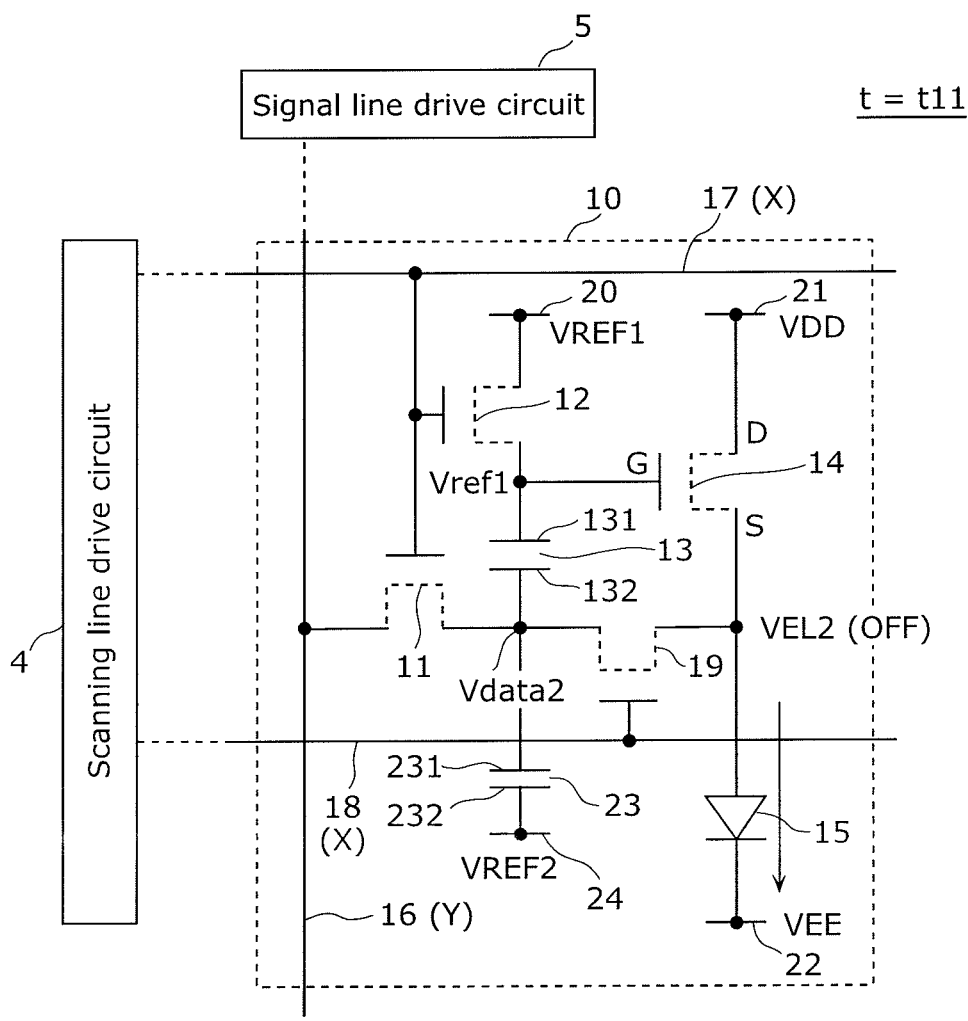
FIG. 5L is a diagram for explaining the operation timing chart for control of a pixel included in the display unit according to the embodiment of the present invention.
Figure 5M:
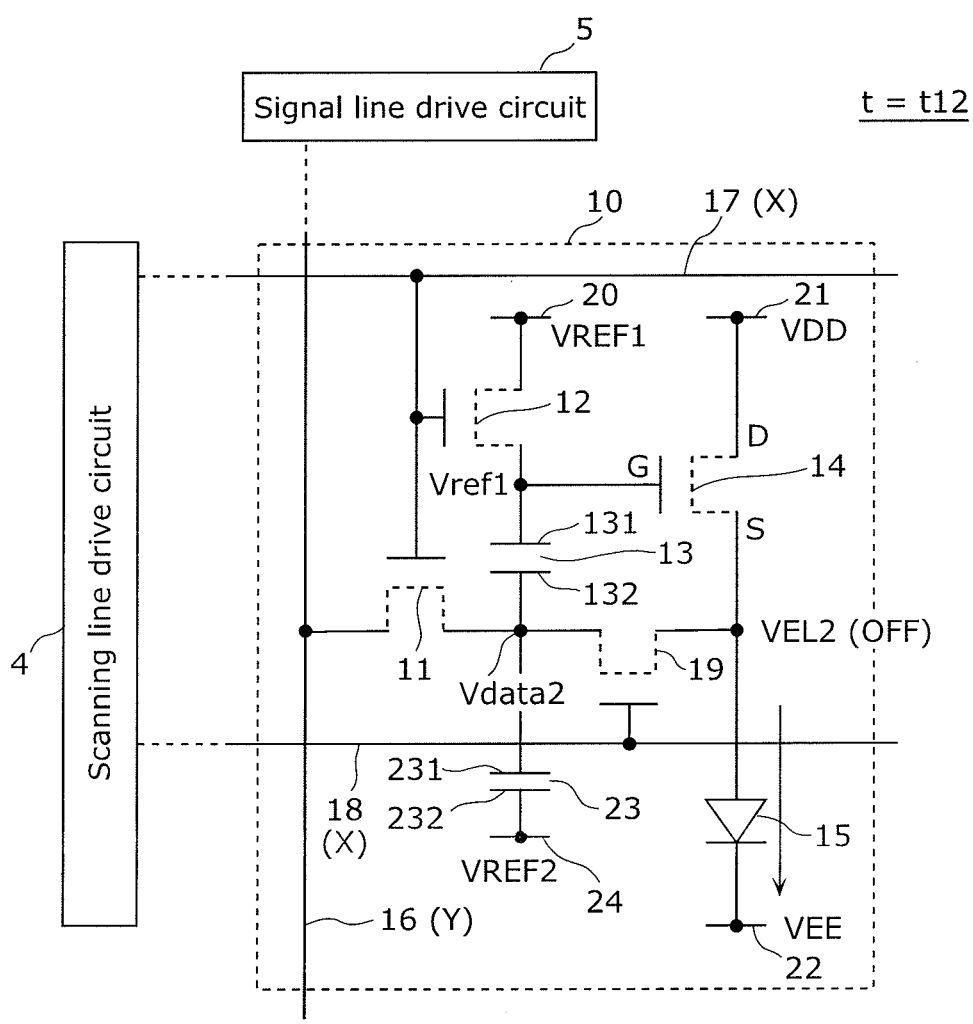
FIG. 5M is a diagram for explaining the operation timing chart for control of a pixel included in the display unit according to the embodiment of the present invention.
Figure 5N:
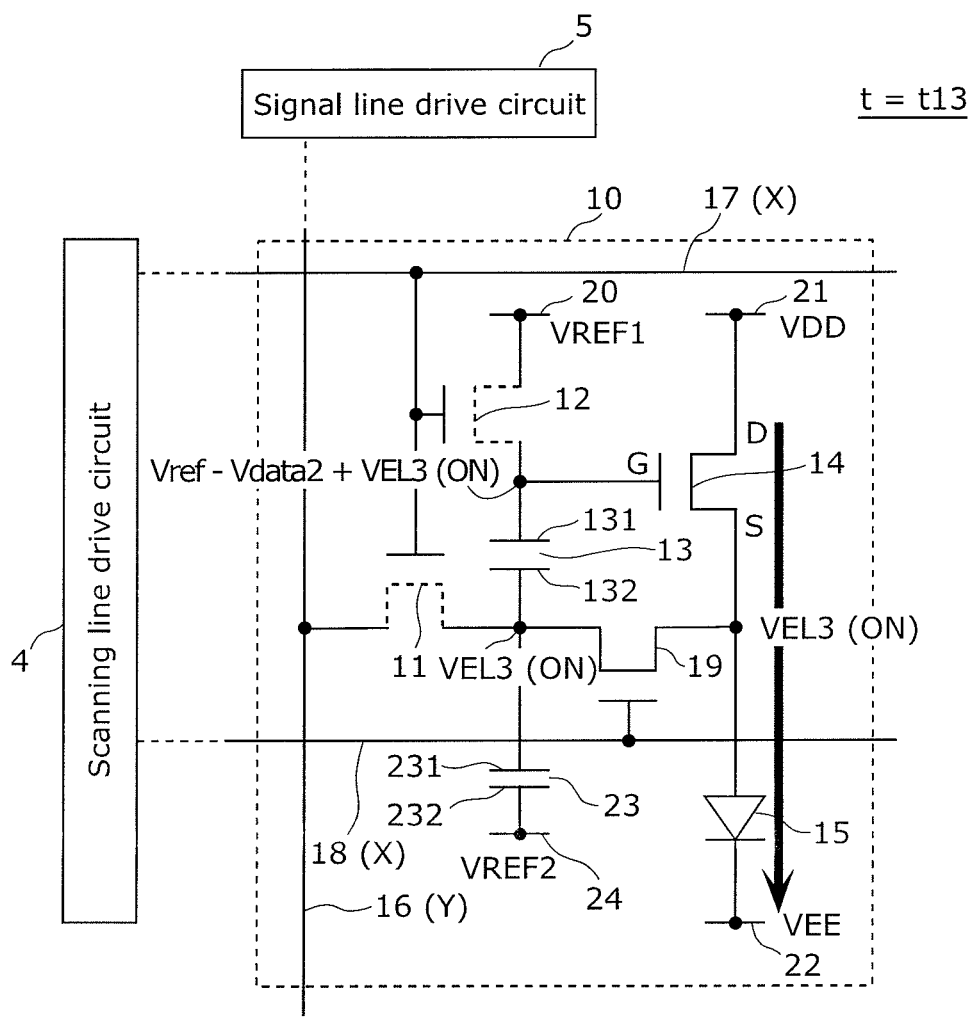
FIG. 5N is a diagram for explaining the operation timing chart for control of a pixel included in the display unit according to the embodiment of the present invention.

FIG. 5A to FIG. 5N are diagrams for explaining the operation timing chart for control of a pixel included in the display unit according to the embodiment of the present invention, showing conduction in the pixel circuit. The following description is based on the premise that the voltage level of HIGH is +20V and the voltage level of LOW is −10V both for the scanning line 17 (x) and the scanning line 18 (x), but it is also possible to provide different HIGH levels or different LOW levels for the scanning line 17 and the scanning line 18 depending on electric characteristics of the switching transistors 11, 12, and 19.

First, at a time point t0, the scanning line drive circuit 4 keeps the voltage level of the scanning line 17 (1) to the scanning line 17 (n) for all the pixels 10 of the upper display part 6a and the lower display part 6b LOW as shown in FIG. 4, so that the switching transistors 11 and 12 remain OFF. On the other hand, the scanning line drive circuit 4 changes the voltage level of the scanning lines 18 (1 to p) and the scanning lines 18 (p+1 to n) for all the pixels 10 of the upper display part 6a and the lower display part 6b from HIGH to LOW, so that the switching transistors 19 are turned OFF. Then, there is no conduction between the source of the drive transistor 14 and the electrode 132 of the electrostatic holding capacitor 13 in each of all the pixels 10 of the upper display part 6a and the lower display part 6b (for example, see FIG. 5A). The time point t0 is thus immediately after the source of the drive transistor 14 and the electrode 132 of the electrostatic holding capacitor 13 are electrically disconnected. Then, the electrode 132 of the electrostatic holding capacitor 13 holds a voltage of the anode of the organic EL element 15 (VEL1 (ON)) due to the electrostatic holding capacitor 23, and the electrostatic holding capacitor 13 keeps the gate voltage of the drive transistor 14 at the level when the switching transistor 19 is ON, so that the organic EL element 15 keeps generation of photons.

Next, at a time point t1, a non-display period of the pixel 10 and a resetting period of the drive transistor 14 are started as shown in FIG. 3A and FIG. 4. Although the non-display period and the resetting period are started in all the pixels 10 of the upper display part 6a and the lower display part 6b in the present embodiment, one of the pixels 10 shall be described below.

Specifically, the scanning line drive circuit 4 keeps the voltage level of the scanning line 18 (x) LOW so that the switching transistor 19 remains OFF (non-conductive) as shown in FIG. 4 and FIG. 5B. The scanning line drive circuit 4 also changes the voltage level of the scanning line 17 (x) from LOW to HIGH while the switching transistor 19 is OFF (non-conductive) so that the switching transistor 12 and the switching transistor 11 are turned ON (conductive).

Specifically, at the time point t1, a reference voltage of the reference power supply line 20 (VREF1) is applied to the gate of the drive transistor 14, and a voltage equivalent to the total of the voltage of the negative power supply line 22 (VEE) and a voltage having a value larger than or equal to the absolute value of a photon-generating threshold voltage of the organic EL element 15 is applied to the source of the drive transistor 14. In addition, the reference voltage VREF1 of the reference power supply line 20 is applied to the electrode 131 of the electrostatic holding capacitor 13 so that the electrode 131 of the electrostatic holding capacitor 13 holds the reference voltage (VREF1) of the reference power supply line 20. With this, the drive transistor 14 is turned OFF.

To put it another way, at the time point t1, the switching transistor 19 is OFF (non-conductive) so that the potential of the anode of the organic EL element 15, which is equal to the source voltage of the drive transistor 14, gradually approaches the total of the voltage of the negative power supply line 22 (VEE) and a voltage having a value equal to the absolute value of the photon-generating threshold voltage of the organic EL element 15. With this, discharge of unnecessary charges accumulated in the drive transistor 14 and the organic EL element 15 during the non-display period in a previous frame ((N−1) frame), that is, resetting of the drive transistor 14 is started.

At the same time, the source of the drive transistor 14 is being set to a fixed voltage corresponding to the potential of the negative power supply line 22 (VEE).

Here, the fixed voltage corresponding to the potential of the negative power supply line 22 (VEE) has a value which is, for example, the total of the value of the voltage of the negative power supply line 22 (VEE) and the absolute value of a threshold voltage at which the organic EL element 15 starts generating photons (Vth(EL)). Therefore, application of a reversed bias (constant voltage) to the drive transistor 14 is started so that Vgs−Vth(TFT)=VREF1−(VEE+Vth(EL))−Vth(TFT)=−1<0, where VEE=5 V, VREF1=5 V, Vth(EL)=2 V, Vth(TFT)=1 V.

Then, the drive transistor 14 turns OFF and the source-drain current of the drive transistor 14 does not flow, so that the organic EL element 15 generates no photons. In other words, the organic EL element 15 does not generate photons at the time point t1. With this, causing conduction of the switching transistor 11 and conduction of the switching transistor 12 through the scanning line 17 while the switching transistor 19 is OFF (non-conductive) is equivalent to application of a reversed bias (a constant voltage) between the gate and the source of the drive transistor 14, so that convergence of the source potential (resetting period) of the drive transistor 14 due to self-discharge of the organic EL element 15 is started with certainty.

Next, at a time point t2, the scanning line drive circuit 4 changes the voltage level of the scanning line 17 (x) from HIGH to LOW as shown in FIG. 4 so that the switching transistors 11 and 12 are turned OFF (non-conductive). With this, the electrode 131 of the electrostatic holding capacitor 13 and the reference power supply line 20 are electrically disconnected (non-conductive) and the electrode 132 of the electrostatic holding capacitor 13 and the signal line 16 are electrically disconnected (non-conductive) as shown in FIG. 5C. At the same time, the source of the drive transistor 14 is being set to a fixed voltage corresponding to the potential of the negative power supply line 22 (VEE).

More specifically, at the time point t2, the scanning line drive circuit 4 keeps the voltage level of the scanning line 18 (x) LOW as shown in FIG. 4 so that the switching transistor 19 remains OFF (non-conductive). The scanning line drive circuit 4 changes the voltage level of the scanning line 17 (x) from HIGH to LOW while the switching transistor 19 is OFF (non-conductive) so that the switching transistor 12 and the switching transistor 11 are turned OFF (non-conductive). It should be noted that the drive transistor 14 is being reset at this time. This is because the electrostatic holding capacitor 23 reduces change in the potential of the first electrode 231 of the electrostatic holding capacitor 23, that is, the second electrode 132 of the electrostatic holding capacitor 13 even after the switching transistor 11 and the switching transistor 12 turn from ON (conductive) to OFF (non-conductive), and the electrostatic holding capacitor 13 thereby reduces change in the potential of the first electrode 131 of the electrostatic holding capacitor 13. In other words, the electrostatic holding capacitor 13 and the electrostatic holding capacitor 23 stabilize the gate potential of the drive transistor 14 at VREF1 even after the time point t2 at which the switching transistor 12 and the switching transistor 11 turn OFF (non-conductive), so that a reversed bias (constant voltage) is continuously applied between the gate and the source of the drive transistor 14.

Next, at a time point t3, setting a signal voltage in the electrode 132 of the electrostatic holding capacitor 13 (writing period) is started as shown in FIG. 4.

Specifically, the scanning line drive circuit 4 keeps the voltage level of the scanning line 18 (x) LOW so that the switching transistor 19 remains OFF (non-conductive) as shown in FIG. 4 and FIG. 5D. The scanning line drive circuit 4 changes the voltage level of the scanning line 17 (x) from LOW to HIGH while the switching transistor 19 is OFF (non-conductive) so that the switching transistor 12 and the switching transistor 11 are turned ON (conductive).

It should be noted that the drive transistor 14 is still being reset. This is because the drive transistor 14 is reset by applying a constant voltage (reversed bias) between the gate and the source of the drive transistor 14.

Specifically, at the time point t3, a reference voltage of the reference power supply line 20 (VREF1) is applied to the gate of the drive transistor 14, and a voltage equivalent to the total of the voltage of the negative power supply line 22 (VEE) and a voltage having a value smaller than or equal to the absolute value of a photon-generating threshold voltage of the organic EL element 15 is applied to the source of the drive transistor 14. In addition, the reference voltage VREF1 of the reference power supply line 20 is applied to the electrode 131 of the electrostatic holding capacitor 13 so that the electrode 131 of the electrostatic holding capacitor 13 holds the reference voltage (VREF1) of the reference power supply line 20. The drive transistor 14 is thereby continuously being reset.

Furthermore, at the time point t3, the signal line drive circuit 5 applies the signal voltage (Vdata1) to the signal line 16 (y). Then, the voltage of the electrode 132 of the electrostatic holding capacitor 13 (voltage Vx) is set to the signal voltage (Vdata1) of the signal line 16. On the other hand, the voltage of the electrode 131 of the electrostatic holding capacitor 13 is set to the reference voltage (VREF1) of the reference power supply line 20. With this, a voltage corresponding to the potential difference between the signal voltage (Vdata) and the reference voltage (VREF1) is held by the electrostatic holding capacitor 13.

The reference voltage VREF1 is an OFF-state voltage at which the drive transistor 14 is OFF (non-conductive). The condition for turning OFF the drive transistor 14 is VREF1≤VEE+Vth(EL)+Vth(TFT) where the photon-generating threshold voltage of the organic EL element 15 is Vth (EL) and the threshold voltage of the drive transistor 14 is Vth(TFT). For example, when the threshold voltage of the drive transistor 14 is 1 V and the photon-generating threshold voltage of the organic EL element 15 is 2 V in an absolute value, the voltage of the positive power supply line 21 is set at 25 V, the voltage of the negative power supply line 22 is set at 5 V, and the voltage of the reference power supply line 20 is set at 5 V.

Next, during the period from the time point t3 to a time point t4, the voltage level of the scanning line 17 (x) is HIGH as shown in FIG. 4, so that the signal voltage (Vdata1) is applied from the signal line 16 (x) to the electrode 132 of the pixel 10. The voltage of the source of the drive transistor 14 of each of the pixels 10 included in a pixel row is set at a fixed voltage corresponding to the potential of the negative power supply line 22 (VEE).

In this period, connected to the reference power supply line 20 is only capacitive load, and therefore there is no stationary current or voltage drop while the voltage level of the scanning line 17 is HIGH. The potential difference between the drain and the source of the switching transistor 12 is 0 V when charging of the electrostatic holding capacitor 13 is completed. The same occurs to the signal line 16 and the switching transistor 11. Thus, a reference potential (VREF1) and a signal voltage (Vdata) which accurately correspond to the signal voltage are written in the electrode 131 and the electrode 132 of the electrostatic holding capacitor 13, respectively.

Next, at a time point t4, the scanning line drive circuit 4 changes the voltage level of the scanning line 17 (x) from HIGH to LOW as shown in FIG. 4 so that the switching transistors 11 and 12 are turned OFF (non-conductive). With this, the electrode 131 of the electrostatic holding capacitor 13 and the reference power supply line 20 are electrically disconnected (non-conductive) and the electrode 132 of the electrostatic holding capacitor 13 and the signal line 16 are electrically disconnected (non-conductive) as shown in FIG. 5E.

More specifically, at the time point t4, the scanning line drive circuit 4 keeps the voltage level of the scanning line 18 (x) LOW as shown in FIG. 3A so that the switching transistor 19 remains OFF (non-conductive). The scanning line drive circuit 4 changes the voltage level of the scanning line 17 (x) from HIGH to LOW while the switching transistor 19 is OFF (non-conductive) so that the switching transistor 12 and the switching transistor 11 are turned OFF (non-conductive). It should be noted that the drive transistor 14 is being reset at this time. This is because, as described above, the electrostatic holding capacitor 23 and the electrostatic holding capacitor 13 reduce change in the potential of the electrode 131 of the electrostatic holding capacitor 13 even after the switching transistor 11 and the switching transistor 12 turn from ON (conductive) to OFF (non-conductive). In other words, the electrostatic holding capacitor 13 and the electrostatic holding capacitor 23 stabilize the potential held by the electrode 131 of the electrostatic holding capacitor 13 even after the time point t4 at which the switching transistor 12 and the switching transistor 11 turn OFF (non-conductive) again. When a resetting period of the drive transistor 14 having a sufficient duration is secured, the potential of the source of the drive transistor 14 approaches a fixed voltage (VEE+Vth (EL)) corresponding to the reference voltage VREF1 all the more for the duration of resetting period, which is preferable. In the present embodiment, the resetting period lasts until a time point t6.

In the present embodiment, however, the potential of the source of the drive transistor 14 is close to a fixed voltage (VEE(off)=VEE+Vth(EL)) corresponding to the reference voltage VREF1 at a time t5 (for example, see FIG. 5F). Here, the fixed voltage corresponding to the reference voltage (VREF1) is a potential determined based on electric characteristics of the drive transistor 14, electric characteristics of the organic EL element 15, and the reference voltage VREF1.

Next, at a time point t6, a resetting period of the drive transistor 14 is terminated and a display period is started as shown in FIG. 4. Specifically, as shown in FIG. 4, keeping the voltage level of the scanning line 17 (x) LOW so that the switching transistor 11 and the switching transistor 12 remain OFF (non-conductive), the scanning line drive circuit 4 changes the voltage level of the scanning line 18 (x) from LOW to HIGH so that the switching transistor 19 is turned ON (conductive).

Then, the source of the drive transistor 14 and the electrode 132 of the electrostatic holding capacitor 13 are electrically connected as shown in FIG. 5G. On the other hand, the electrode 131 of the electrostatic holding capacitor 13 is electrically disconnected from the reference power supply line 20, and the electrode 132 is electrically disconnected from the signal line 16.

With this, at the time point t6, the electrostatic holding capacitor 13 is electrically connected to between the gate and the source of the drive transistor 14, and the gate of the drive transistor 14 is set at a potential of the electrode 131 of the electrostatic holding capacitor 13 (VREF1−Vdata+VEL (off)), and the source of the drive transistor 14 is set at a potential of the electrode 132 of the electrostatic holding capacitor 13 (VEL2(off)). To put it another way, the potential difference between the electrode 131 and the electrode 132 of the electrostatic holding capacitor 13 (VREF1−Vdata) is applied between the gate electrode and the source electrode of the drive transistor 14. Then, a current flows between the drain and the source of the drive transistor 14 according to the potential difference between the gate electrode and the source electrode of the drive transistor 14, and thereby the organic EL element 15 starts generating photons. When the organic EL element 15 starts generating photons, the potential of the source of the drive transistor 14 changes to VEL(ON). Then, the potential of the gate of the drive transistor 14 is set at a potential of the electrode 131 of the electrostatic holding capacitor 13 (VREF1−Vdata+VEL(on)), so that the potential difference between the electrode 131 and the electrode 132 of the electrostatic holding capacitor 13 (VREF1−Vdata) is continuously applied between the gate electrode and the source electrode of the drive transistor 14. In other words, the gate potential of the drive transistor 14 changes with change in the source potential by bootstrapping, and a voltage across the electrostatic holding capacitor 13 (VREF1−Vdata) is applied between the gate and the source of the drive transistor 14, so that a signal current corresponding to the voltage (VREF1−Vdata) flows into the organic EL element 15, causing the organic EL element 15 to generate photons. It should be noted that, in the present embodiment, the source potential of the drive transistor 14 changes, for example, from 7 V to 10 V due to conduction of the switching transistor 19.

In the period from the time point t6 to a time point t7 (namely, a display period), the voltage across the electrostatic holding capacitor 13 (VREF1−Vdata) is continuously applied between the gate and the source, and the signal current thereby flows to cause the organic EL element 15 to keep generating photons.

The period from the time point t0 to the time point t7 corresponds to one frame period in which luminescence intensities of all the pixels of the display device 1 are refreshed, and the operation in the period from the time point t0 to the time point t7 is repeated after the time point t7. For example, a time point t7 to a time point t14 in an (N+1) frame period correspond to the time point t0 to the time point t7, respectively. The operation in the method of controlling the pixels of the display unit from the time point t7 to the time point t14 shown in FIG. 4 and FIG. 5H to FIG. 5N is the same as in the period from the time point t0 to the time point t7, and therefore the description thereof is omitted.

The pixels 10 of the display unit 6 are controlled as described above so that change in threshold voltage due to charges accumulated in the drive transistor 14 during the photon-generating period in the previous frame is reduced. In other words, with the resetting period having a sufficient duration as described above, the threshold voltage of the drive transistor 14 can be stabilized. To put it another way, the electric characteristics of the drive transistor 14 at the start of generation of photons allow provision of a desired current to the organic EL element 15 after the resetting period without being affected by the previous frame.

Furthermore, the electrostatic holding capacitor 13 holds a voltage corresponding to the potential difference between the signal voltage (for example, Vdata1) and the reference voltage (VREF1), and a combined capacitance of the electrostatic holding capacitor 13 and the electrostatic holding capacitor 23 allows stable supply of the reference voltage (VREF1) to the gate of the drive transistor 14, and resetting is thereby started. As such, the signal line 16 is not occupied by one cycle of luminescence production in one pixel during two operations of data writing, that is, writing for stopping photon generation and writing for photon generation. As a result, writing is necessary only once for each pixel in a row, so that two-fold writing speed is not necessary for completing writing of data in all the rows in a determined frame period. In other words, it is not necessary to lower a wiring time constant for the signal line 16 and the scanning lines 17 and 18 or to form a thick wiring film or a thick inter wiring insulation film. Accordingly, reduction in process time, increase in throughput, and cost reduction can be achieved.

It should be noted that, although one of the pixels 10 of the upper display part 6a and the lower display part 6b is used as an example for description of the writing period, the writing period does not start in all the pixels of the upper display part 6a and the lower display part 6b at once. As described above, the writing period starts in each of the pixels 10 of the upper display part 6a. In other words, in the writing period, a desired signal voltage is written in each of the pixels 10 of the upper display part 6a by controlling each of the scanning line 17 (1) to the scanning line 18 (p) of the pixel from the time point t3 and the time point t4 in a corresponding manner as described above. The same occurs to the lower display part 6b. It should be noted that a desired signal voltage is written in each of the pixels 10 of the upper display part 6a and the lower display part display unit 6b as described in the present embodiment, and desired signals may be synchronously written in corresponding ones of the pixels 10 of the upper display part 6a and the lower display part 6b as shown in FIG. 3A and FIG. 3B.

The following describes a mechanism for stabilizing the threshold voltage of the drive transistor 14 by securing a resetting period having a sufficient duration without being affected by a previous frame as described above.

One of the pixels 10 shall be described below as an example. First, change in threshold voltage due to charges accumulated in the drive transistor 14 in the photon-generating period of the previous frame shall be described, which is followed by a description of an effect of resetting in the display device according to the present embodiment under the control as described above.

Figure 6:
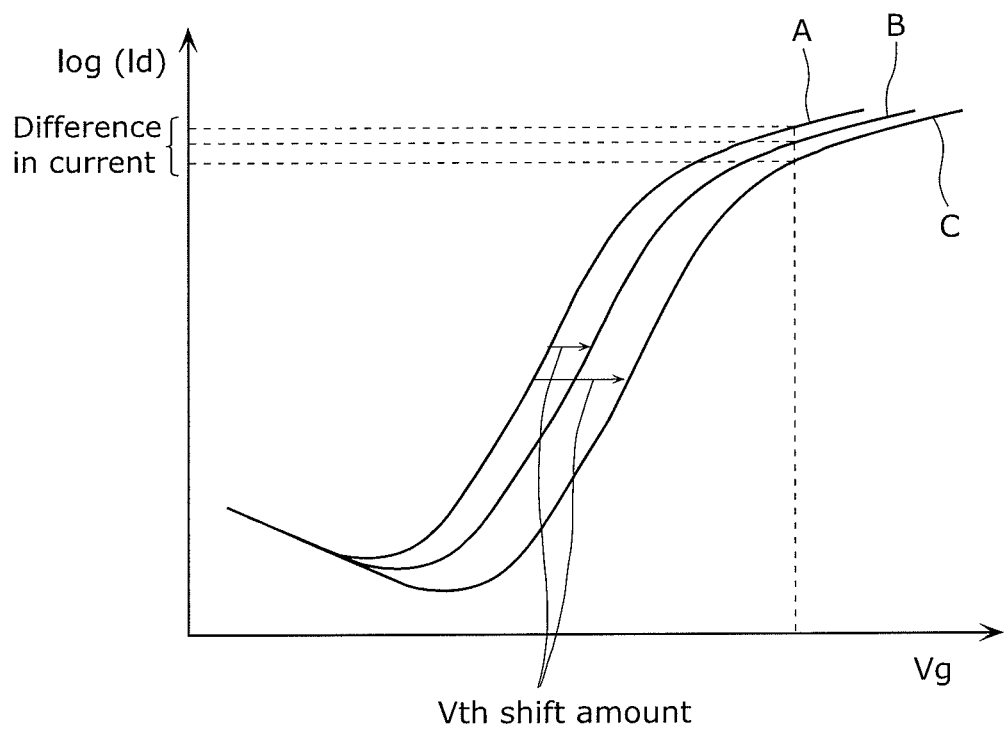
FIG. 6 is a characteristics chart showing change in threshold voltage due to charges accumulated in a drive transistor.
Figure 7:
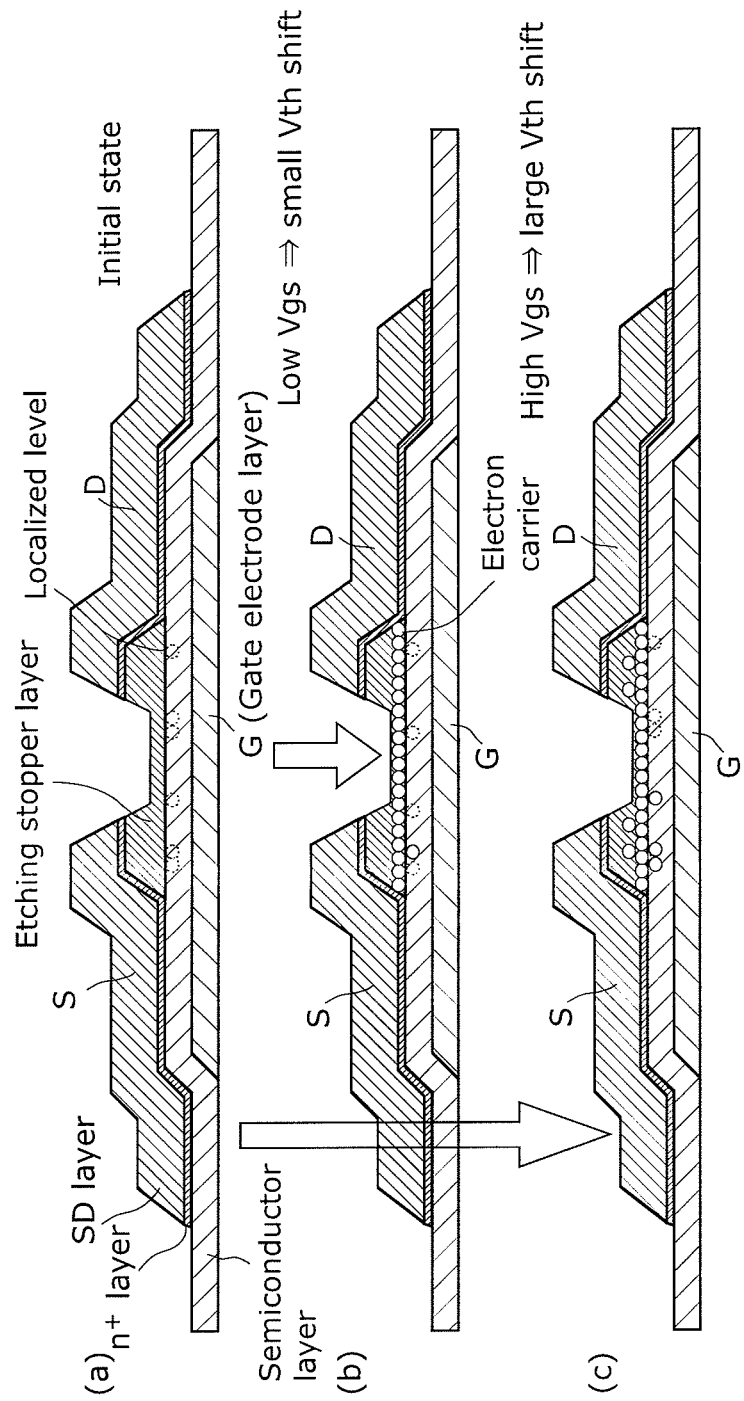
FIG. 7 schematically shows the charges accumulated in the drive transistor.

FIG. 6 is a characteristics chart showing change in threshold voltage due to charges accumulated in a drive transistor. FIG. 7 schematically shows the charges accumulated in the drive transistor.

In FIG. 6, the vertical axis represents log values (Id) of current values, and the horizontal axis represents values of gate voltage applied to the gate.

The curve A in FIG. 6 shows the initial characteristics of the drive transistor. (a) in FIG. 7 schematically shows charges accumulated in the drive transistor having the initial characteristics (indicated by the curve A). Similarly, the curve B shows the characteristics of the drive transistor 14 when stress of voltage applied between the gate and the source (also referred to as Vgs stress) is low. (b) in FIG. 7 schematically shows charges accumulated in the drive transistor having the characteristics shown by the curve B. The curve C shows the characteristics of the drive transistor when the Vgs stress is high. (c) in FIG. 7 schematically shows charges accumulated in the drive transistor having the characteristics indicated by the curve C.

FIG. 6 and FIG. 7 show that the higher the Vgs stress applied to the drive transistor is, the more the accumulated charges are. FIG. 6 and FIG. 7 also show that the more the accumulated charges are (the higher the applied Vgs stress is), the larger the change in the threshold for the drive transistor (Vth shift) is. In other words, the accumulation of charges in a frame period causes the change in the voltage-current characteristics of the drive transistor.

In addition, the charges are accumulated under Vgs stress over a relatively long time, and clearing the accumulated charges also takes a relatively long time as it is known. Such accumulated charges are therefore insufficiently cleared in a panel in which a resetting period is not long enough. As a result, there is a problem that an afterimage occurs due to change in the characteristics of a drive transistor.

Figure 8:
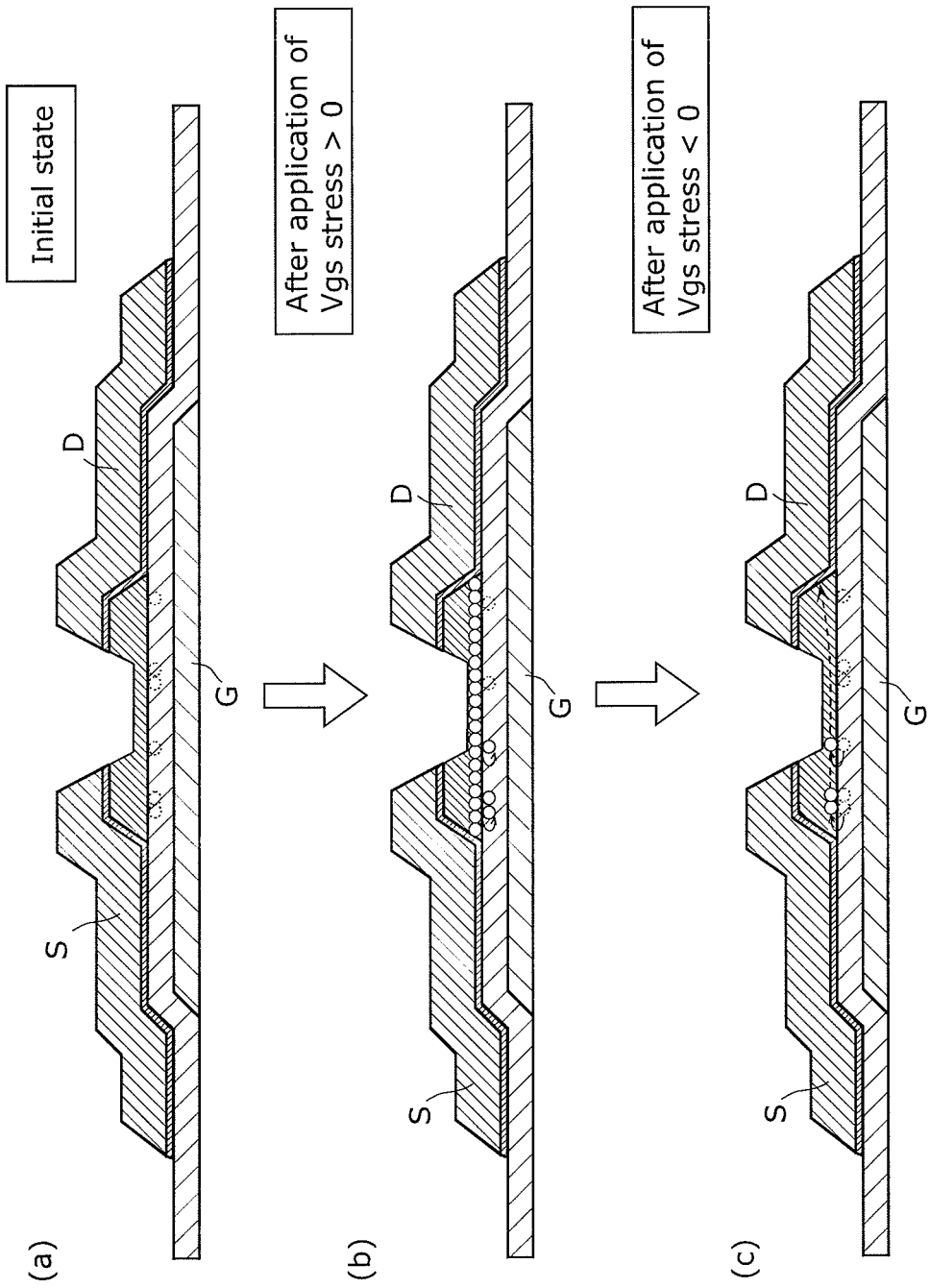
FIG. 8 schematically shows an effect of resetting that the charges accumulated in the drive transistor are cleared.

In contrast, a resetting period of the display device or the method of controlling the display device according to the present embodiment has such a long duration that accumulated charges can be cleared and the characteristics of the drive transistor is thereby initialized. This is schematically shown in FIG. 8. Here, FIG. 8 schematically shows the effect of resetting that the charges accumulated in the drive transistor are cleared. It should be noted that this is schematically shown in FIG. 8 using the structure shown in FIG. 7.

As shown in (a) in FIG. 8, a Vgs stress greater than zero is applied to the drive transistor in an initial state. Then, charges are trapped at a localized level of the gate insulation film of the drive transistor as shown in (b) in FIG. 8. Here, the Vgs stress greater than zero can be applied by applying, for example, 12 V to the source, 25 V to the drain, and 10 V to the gate.

After a resetting period having a sufficient duration elapses in the controlling method, the charges trapped at the localized level of the gate insulation film of the drive transistor are emitted so that the drive transistor enters a state equivalent to the initial state as shown in (c) in FIG. 8. Here, a Vgs stress smaller than zero is applied to the drive transistor in the resetting period by applying, for example, 0 V to the source, 5 V to the drain, and 5 V to the gate. The charges trapped at the localized level of the gate insulation film of the drive transistor are thereby discharged.

Although the structure of the drive transistor described above is a channel-etch structure, which is described as an example, the structure of the drive transistor is not limited to this. The drive transistor may have an etching stopper structure.

As described above, according to the display device and the method of controlling the display device in the present embodiment, simple pixel circuitry makes a split line visually unrecognizable and prevents occurrence of an afterimage due to change in electric characteristics of a drive transistor when a display area is vertically split into parts for driving.

Figure 9:
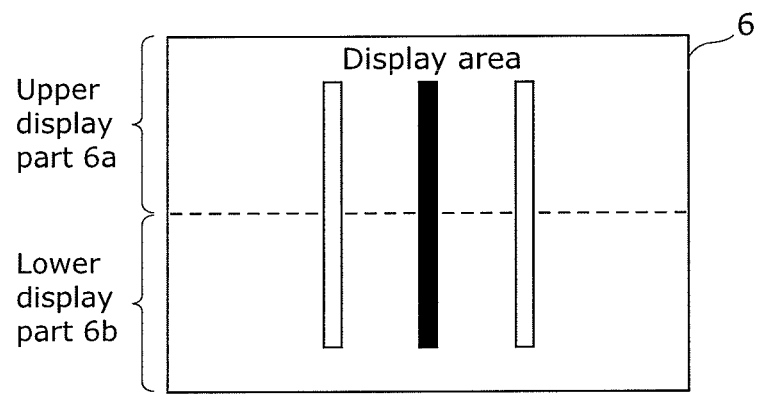
FIG. 9 is a diagram for describing effects of the display device according to the present invention.

Specifically, in the display device according to the present embodiment, the entire display area of the display unit 6 is caused to start generating photons at once at the beginning of a display period, and the entire display area of the display unit 6 is caused to stop generating photons at once at the beginning of a non-display period as described above. This solves the problem that an object displayed has a breakup at a split line (the breakup is conspicuous when a white vertical bar is moved sideways) during sequential photon generation. For example, an advantageous effect is that the split line between the upper display part 6a and the lower display part 6b in the display area of the display unit 6 is visually unrecognizable as shown in FIG. 9. Here, FIG. 9 is a diagram for describing effects of the display device according to the present invention.

Furthermore, in the display device according to the present embodiment, a non-display period is also a resetting period. The resetting period therefore has a sufficient duration so that a negative effect (afterimage) due to change in electric characteristics can be reduced.

It is preferable that the resetting period last for 20% of a frame period or longer. In the control method described above, the resetting period is identical with the non-photon-generating period. Here, the non-photon-generating period is, for example, a period from a time point t1 to a time point t7 and corresponds to a period from when the switching transistor 11 and the switching transistor 12 are made conductive while the switching transistor 19 is non-conductive to when the switching transistor 19 is made conductive while the switching transistor 11 and the switching transistor 12 are non-conductive. Here, a frame period is, for example, a period from a time point t1 to a time point t8 and corresponds to a period from when the switching transistor 11 and the switching transistor 12 are made conductive while the switching transistor 19 is non-conductive (the time point t1) to when the switching transistor 11 and the switching transistor 12 are next made conductive while the switching transistor 19 is non-conductive (the time point t8).

A display device according to the present invention is thus provided, including simple pixel circuitry which makes a split line visually unrecognizable and prevents occurrence of an afterimage due to change in electric characteristics of a drive transistor when a display area is vertically split into parts for driving.

Although only an exemplary embodiment of the present invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

It should be noted that although the drive transistor 14 is an N-type transistor and the cathode of the organic EL element 15 is connected to a common power supply line in the embodiment described above, the drive transistor 14 may be a P-type transistor and the anode of the organic EL element 15 may be connected to the common power supply line such that the display device can provide the same effects as in the embodiment described above.

Figure 10:
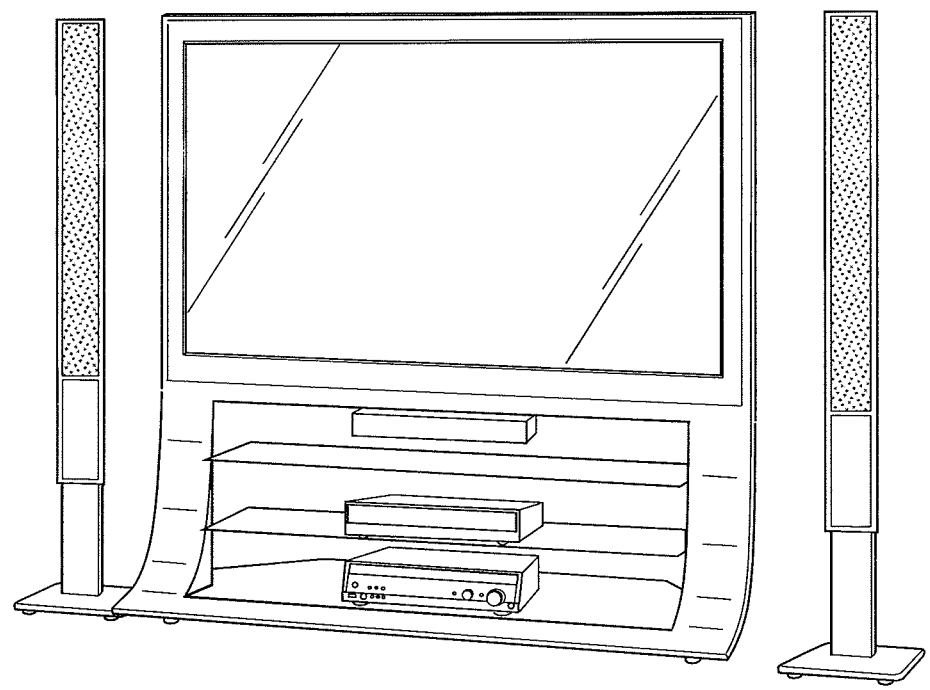
FIG. 10 is an outline view of a flat-panel TV in which the display device in the present invention is built into.
Figure 11:
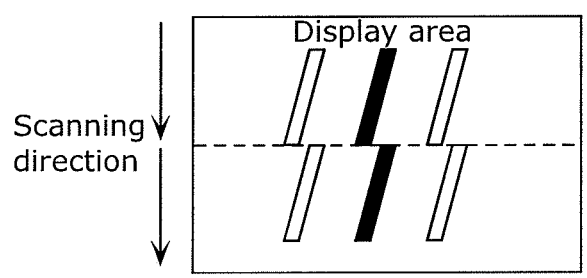
FIG. 11 is a diagram fro describing the problem to be solved by the present invention.

Furthermore, for example, the display device according to the present invention is built into a thin, flat TV as shown in FIG. 10. The thin, flat TV having the built-in display device according to the present invention is capable of high-accuracy image display reflecting a video signal.

INDUSTRIAL APPLICABILITY

The present invention is particularly useful in an active-type organic EL flat panel display which causes luminance to change by controlling pixel luminescence intensity according to a pixel signal current.

What is claimed is:

1. A display device, comprising:
    a display composed of a first display and a second display; and
    a driver which is configured to drive the first display and the second display,
    wherein each of the first display and the second display includes:
        a plurality of pixels arranged in rows and columns;
        a scanning line provided for each of the rows;
        a control line provided for each of the rows;
        a data line provided for each of the columns; and
        a first power supply line and a second power supply line for supplying power to the pixels, each of the pixels includes:
  a luminescence element having electrodes one of which is connected to the second power supply line;
  a drive transistor having a source electrode connected to the luminescence element and a drain electrode connected to the first power supply line;
  a first capacitor having electrodes one of which is connected to a gate electrode of the drive transistor;
  a first switching transistor which has a gate electrode connected to the scanning line and switches conduction and non-conduction between the gate electrode of the drive transistor and a first reference potential line which provides a predetermined reference potential;
  a second switching transistor which has a gate electrode connected to the scanning line and switches conduction and non-conduction between the data line and the other of the electrodes of the first capacitor;
  a third switching transistor which has a gate electrode connected to the control line and switches conduction and non-conduction between the other of the electrodes of the first capacitor and the source electrode of the drive transistor; and
  a second capacitor having electrodes one of which is connected to the other of the electrodes of the first capacitor and the other of which is connected to a second reference potential line which provides a predetermined reference potential,
the driver is configured to:
  cause conduction of the first switching transistor through the scanning line in each of all the pixels of the first display and the second display to apply the predetermined reference potential to the gate electrode of the drive transistor in the pixel, and thereby stop photon generation of all of the pixels at a same time so that a non-display period is started; and
  cause conduction of the third switching transistor through the control line in each of all the pixels of the first display and the second display to apply a signal voltage held by the first capacitor between the gate electrode and the source electrode of the drive transistor in the pixel, and thereby start photon generation of all of the pixels at a same time so that a display period is started,
the non-display period includes a resetting period in which the drive transistor in each of all the pixels of the first display and the second display is initialized, and
the resetting period is
  started by the driver applying a reset voltage to the data line, turning the first switching transistor and the second switching transistor conductive through the scanning line, and turning the third transistor conductive through the control line, so that the reset voltage is applied to the source electrode of the drive transistor and the predetermined reference potential is applied to the gate electrode of the drive transistor, and
  after a signal voltage writing period in which, in each of all the pixels of the first display and the second display, the first capacitor is caused to hold a signal voltage terminated by the driver turning the third switching transistor conductive through the control line so that the signal voltage held by the first capacitor is applied between the gate electrode and the source electrode of the drive transistor.

2. The display device according to claim 1,
wherein the signal voltage writing period is included in the resetting period, and
in the signal voltage writing period, while the third switching transistor in each of all the pixels of the first display and the second display is non-conductive, the driver is configured to cause conduction of the first switching transistor and conduction of the second switching transistor in each of the pixels in each of the rows through the scanning line provided for the row, and cause the first capacitor in each of the pixels to hold a signal voltage transmitted from the data line provided for one of the columns which includes the pixel, so that the first capacitor of each of all the pixels of the first display and the second display is caused to hold the signal voltage.

3. The display device according to claim 1,
wherein the resetting period lasts for at least 20% of a total length of the display period and the non-display period.

4. A display device, comprising:
a display composed of a first display and a second display; and
a driver which is configured to drive the first display and the second display,
wherein each of the first display and the second display includes:
  a plurality of pixels arranged in rows and columns;
  a scanning line provided for each of the rows;
  a control line provided for each of the rows;
  a data line provided for each of the columns; and
  a first power supply line and a second power supply line for supplying power to the pixels,
each of the pixels includes:
  a luminescence element having electrodes one of which is connected to the second power supply line;
  a drive transistor having a source electrode connected to the luminescence element and a drain electrode connected to the first power supply line;
  a first capacitor having electrodes one of which is connected to a gate electrode of the drive transistor;
  a first switching transistor which has a gate electrode connected to the scanning line and switches conduction and non-conduction between the gate electrode of the drive transistor and a first reference potential line which provides a predetermined reference potential;
  a second switching transistor which has a gate electrode connected to the scanning line and switches conduction and non-conduction between the data line and the other of the electrodes of the first capacitor;
  a third switching transistor which has a gate electrode connected to the control line and switches conduction and non-conduction between the other of the electrodes of the first capacitor and the source electrode of the drive transistor; and
  a second capacitor having electrodes one of which is connected to the other of the electrodes of the first capacitor and the other of which is connected to a second reference potential line which provides a predetermined reference potential,
the driver is configured to:
  cause conduction of the first switching transistor through the scanning line in each of all the pixels of the first display and the second display to apply the predetermined reference potential to the gate electrode of the drive transistor in the pixel, and thereby stop photon generation of all of the pixels at a same time so that a non-display period is started; and
  cause conduction of the third switching transistor through the control line in each of all the pixels of the first display and the second display to apply a signal voltage held by the first capacitor between the gate electrode and the source electrode of the drive transistor in the pixel, and thereby start photon generation of all of the pixels at a same time so that a display period is started, the non-display period includes a resetting period in which the drive transistor in each of all the pixels of the first display and the second display is initialized, the resetting period is started by the driver, in each of all the pixels of the first display and the second display, causing non-conduction of the third switching transistor through the control line and causing conduction of the first switching transistor through the scanning line to apply a constant potential of the second power supply line to the source electrode of the drive transistor through the luminescence element and apply the predetermined reference potential to the gate electrode of the drive transistor, and after a signal voltage writing period in which, in each of all the pixels of the first display and the second display, the first capacitor is caused to hold a signal voltage, terminated by the driver turning the third switching transistor conductive through the control line so that the signal voltage held by the first capacitor is applied between the gate electrode and the source electrode of the drive transistor, and wherein the resetting period lasts for at least 20% of a total length of the display period and the non-display period.

5. The display device according to claim 4, wherein the signal voltage writing period is included in the resetting period, and in the signal voltage writing period, while the third switching transistor in each of all the pixels of the first display and the second display is non-conductive, the driver is configured to cause conduction of the first switching transistor and conduction of the second switching transistor in each of the pixels in each of the rows through the scanning line provided for the row, and cause the first capacitor in each of the pixels to hold a signal voltage transmitted from the data line provided for one of the columns which includes the pixel, so that the first capacitor of each of all the pixels of the first display and the second display is caused to hold the signal voltage.

* * * * *